US007610632B2

(12) United States Patent  
Higuchi

(10) Patent No.: US 7,610,632 B2  
(45) Date of Patent: Oct. 27, 2009

(54) SOFTWARE USE PERMISSION METHOD AND SYSTEM

(75) Inventor: Naoshi Higuchi, Tokyo (JP)

(73) Assignee: NEC Corporation (JP)

( * ) Notice: Subject to any disclaimer, the term of this patent is extended or adjusted under 35 U.S.C. 154(b) by 837 days.

(21) Appl. No.: 11/089,715

(22) Filed: Mar. 25, 2005

(65) Prior Publication Data
US 2005/0216414 A1  Sep. 29, 2005

(30) Foreign Application Priority Data
Mar. 25, 2004  (JP) .............................. 2004-088452

(51) Int. Cl.
*G06F 21/00*  (2006.01)
*G06F 9/44*  (2006.01)
(52) U.S. Cl. ........................................ 726/30; 713/168
(58) Field of Classification Search .................... 726/30
See application file for complete search history.

(56) References Cited
U.S. PATENT DOCUMENTS
5,757,914 A * 5/1998 McManis .................... 713/187

5,968,175 A * 10/1999 Morishita et al. ............. 726/28
7,290,288 B2 * 10/2007 Gregg et al. .................. 726/28
2001/0037450 A1 * 11/2001 Metlitski et al. ............ 713/152

FOREIGN PATENT DOCUMENTS

JP  9-231068  9/1997
JP  10-20958  1/1998

* cited by examiner

*Primary Examiner*—Matthew B Smithers  
(74) *Attorney, Agent, or Firm*—Ostrolenk Faber LLP

(57) ABSTRACT

Before providing a software body I, a determination program I is prepared to determine whether a software body II should be authenticated for combination and use with the software body I, and is provided with the software body I. A platform executes the determination program I before the platform employs the software body I with the software body II, and only when the determination results represent the permission for combination and use, the platform permits the software II to be combined and used with the software body I.

50 Claims, 12 Drawing Sheets

SOFTWARE USE PERMISSION METHOD AND SYSTEM

This application claims priority to prior Japanese patent application JP 2004-88452, the disclosure of which is incorporated herein by reference.

BACKGROUND OF THE INVENTION

1. Field of the Invention

The present invention relates to a technique whereby a software provider, for example, restricts the use of software, including computer application programs and digital data.

2. Background of the Invention

As the use of personal computers has spread, businesses for providing software, such as computer application programs (hereinafter referred to as programs) and digital data (hereinafter referred to as data), have become increasingly popular. Because of recent improvements in the processing capabilities of portable information terminals, including cellular phones, and of processors, such as CPUs and MPUs for IC cards, software executed by such devices has been, and continues to be, rapidly developed, and it is predicted that the popularity of software businesses will continue to rise.

In this situation, techniques are in demand whereby software providers, for example, can place restrictions on the use of their software. Especially, techniques restricting the combined use of software are required, because while software providers may authorize the combined use of one of their software and some types of software, they may not authorize the combined use of the same one and other types of software.

As a relevant conventional technique, tamper-proof IC cards are employed as software use platforms to increase the reliability of authorized software use.

For example, according to Japanese Patent Laid-Open Publication No. Hei 10-20958, to increase software use reliability, a software provider provides software using a form or a method that, while not impeding the authorized use of the software, ensures it can be operated only when a specific software use platform, such as an IC card, is used, and a software user employs the software by using the specific software use platform.

As another relevant conventional technique, a digital signature is appended to software when it is distributed, and a software use platform, upon receiving the software, must confirm the trustworthiness of the software by verifying the appended digital signature. A specific example of this is the technique Microsoft Corp. uses for the distribution of ActiveX controls.

According to this type of conventional technique, a software distributor appends a digital signature to software that is to be distributed. And a software use platform, upon receiving the software, identifies the software distributor based on the digital signature and uses the distributed software only if the specified software distributor is trustworthy. In this manner, application limits can be imposed on the use of the software.

As an additional conventional technique, a step that permits one software to verify the reliability of another is included to inhibit the unauthorized combined use of software.

For example, disclosed in Japanese Patent Laid-Open Publication No. Hei 9-231068 is a technique whereby software A verifies the reliability of software B, via a software use platform P, while the software B verifies the reliability of software A, via the same platform P, and only when the trustworthiness of both software A and software B has been verified, the combined use of software A and B is permitted.

According to another conventional technique, such as the one disclosed in Japanese Patent Laid-Open Publication No. Hei 10-20958, a software provider can limit the use of the software it supplies to a specific platform. However, in this case, the software provider can not impose a restriction such that use of the software with specified programs is permitted while use with others is inhibited. This is true because when means for confirming the trustworthiness of a software use platform is provided, according to the technique, no means is included that permits software to individually confirm, for combined use, the trustworthiness of other programs.

A conventional technique such as the ActiveX distribution technique can not limit the combined use of software that can be used with specific software. Furthermore, from the viewpoint of a software user, the use of software can be limited, but it can not be limited from the viewpoint of the software provider, i.e., the software provider can not inhibit the use of software on an unauthorized software use platform. This is because the technique does not include means by which the software provider can confirm the trustworthiness of the software use platform.

Further, according to a conventional technique such as is disclosed in Japanese Patent Laid-Open Publication No. Hei 9-231068, although a restriction can be imposed on software to be combined and used with other, specified software, when a software use platform is not authenticated, the illegal combined use of software A and B can not be prevented. This occurs because since the technique employs the software use platform to confirm the trustworthiness of software, the software use platform may intentionally skip the confirmation of a trustworthy process, or alter the results obtained by such a process.

To resolve these shortcomings, the objective of the present invention is to provide a technique whereby, when a plurality of programs are to be combined and used, the use of individual programs can be restricted, relative to each of the others, without being affected by the trustworthiness of a platform or without the trustworthiness of the platform being confirmed.

SUMMARY OF THE INVENTION

According to one aspect of the invention, a software use permission method, for permitting or inhibiting the combination and use, on a platform that includes a computer, of a plurality of types of software that are provided as digital electronic data, i.e., a plurality of computer programs or a plurality of sets of data is provided. The method includes the steps of: preparing a determination program I, which is a computer program, to determine, before providing a software body I, which is digital electronic information, whether a software body II, which is digital electronic information, should be authenticated for combination and use with the software body I, and providing, as software I, the software body II combined with the software body I, through a computer I; the platform executing the determination program I before the platform employs the software body I with the software body II; only when the determination program I determines that the software body II has been authenticated for combination and use with the software body I, the platform performing a process to permit the software II, as software, to be combined and used with the software body I.

In the method, the software body II may be provided, through a computer II, as the software II, together with a determination program II that is the determination program. In this case, only when both the determination programs I and II determine that the software I and the software II have been authenticated for combination and use, the computer II permits the combined use of the software bodies I and II.

The method may further include: step 1 of the platform generating a message I, for which a digital signature S is provided, that requests provision of the software body I, and transmitting the message I to the computer I, and generating a message II, for which a digital signature S is provided, that requests provision of the software body II, and transmitting the message II to the computer II; step 2 of the computer I providing, for the platform, the software I with a digital signature I, only when the authentication of the platform based on the digital signature S is successful; step 3 of the computer II providing, for the platform, the software II with a digital signature II, only when the authentication of the platform based on the digital signature S is successful; step 4 of the platform authenticating the computer I and the computer II based on the digital signatures I and II provided for the software I and the software II; step 5 of the platform executing the determination programs I and II only when the authentication by both the computers I and II is successful; and step 6 of permitting the combined use of the software bodies I and II only when the determination programs I and II authenticate both the software I and the software II.

In accordance with the determination program I, the platform may perform data communication with a different computer via a data communication network, and perform a determination process in accordance with the determination results obtained by the different computer.

The different computer may be the computer I.

When the software body II is provided, through a computer II, as the software II, together with a determination program II that is the determination program, the method may be as follows: whereby, in accordance with the program I, the platform transmits at least part of the software II to a predesignated computer A via the data communication network; whereby, based on part or all of the received software II, the computer A determines whether the combined use of the software II with the software I should be permitted, and transmits determination results I to the platform via the data communication network; whereby, in accordance with the determination program I, the platform performs a determination process based on the received determination results I; whereby, in accordance with the determination program II, the platform transmits at least part of the software I to a predesignated computer B via the data communication network; whereby, based on part or all of the received software II, the computer B determines whether the combined use of the software II with the software I should be permitted, and transmits determination results II to the platform via the data communication network; and whereby, in accordance with the determination program II, the platform performs a determination process based on the received determination results II. In this case, it may be that at the least, either the computer A is the computer I or the computer B is the computer II is established.

Based on the authentication results obtained based on the digital signature attached in advance to the software II, the determination program I may permit the software II to be combined and used with the software body I.

The computer I may provide software that is encrypted by using an encryption key that conforms to a public encryption method and that is generated by the platform. In this case, upon receiving the software, the platform decrypts the software using a decryption key that is generated and is to be paired with the encryption key.

The computer I may provide the software I in accordance with a message generated by the platform. In this case, the message includes address information indicating the location of the platform.

The address information may be address information for the platform on the data communication network.

The address information may indicate a geographical location of the platform.

The platform and the computer I may be connected to the data communication network. In this case, the computer I may provide the software I for the platform in accordance with a message that is generated by the platform and is transmitted to the computer I via the data communication network. The computer I may provide the software I for the platform via the data communication network.

The platform and the computer I may have a device for reading data from and writing data to a computer-readable removable recording medium. In this case, it is proposed that the platform generates a message and writes the message to the recording medium, and the computer I provides the software I for the platform in accordance with the message read from the recording medium. Otherwise, it is proposed that, to provide the software I, the computer I writes the software I to the recording medium, and the platform reads the software I from the recording medium. For example, the recording medium is a RAM (Random Access Memory) included in an IC card. The IC card preferably includes an MPU (Micro Processing Unit) and serves as the platform.

The software body I may be included as part of the determination program I, and calling of the software body I is performed through the determination program I.

The method is for example applicable to the following combinations of the platform, the software I and the software II. In a first combination, the platform is a computer, the software I is an operating system executed by the computer or a computer program executed by the operating system, and the software II is another computer program executed by the operating system. In a second combination, the platform is a computer, the software I is an operating system executed by the computer or a computer program executed by the operating system, and the software II is data read by the operating system. In a third combination, the platform is constituted by a computer and an operating system executed by the computer, the software I and the software II are computer programs executed by the operating system. In a forth combination, the platform is constituted by a computer and an operating system executed by the computer, and the software I and the software II are data read by the operating system, or by a computer program executed by the operating system. In a fifth combination, the platform is constituted by a computer, an operating system operated by the computer and a first computer program executed by the operating system, and the software I and the software II are computer programs called by the first computer program.

The method is applicable for permitting/inhibiting combined use of three or more software products. The present invention provides a software use permission method, for permitting or inhibiting the combination and use, on a platform including a computer, of a plurality of types of software that are provided as digital electronic data, i.e., a plurality of computer programs or a plurality of sets of data, whereby the plurality of types of software are three or more types; and whereby the above-mentioned method is employed to permit or inhibit the use of at least one of combinations of two types of software from among the plurality of types.

According to another aspect of the invention, a software use permission system, for permitting or inhibiting the combination and use, on a platform that includes a computer, of a plurality of types of software that are provided as digital electronic data, i.e., a plurality of computer programs or a plurality of sets of data, including: the platform; a software body I and a software body II, for which permitting or inhibiting of combined use on the platform is determined; a determination program I, which is a computer program to determine whether the software body II should be authenticated for combination and use with the software body I, and is executed by the platform; a computer I for providing, as software I, the software body I and the determination program I for the platform; and a computer II for providing the software II for the platform, wherein, only when the determination program I determines that the software body II has been authenticated for combination and use with the software body I, the platform permits the software II, as software, to be combined and used with the software body I.

The software body II may be provided, through a computer II, as the software II, together with a determination program II that is the determination program. In this case, only when both the determination programs I and II determine that the software I and the software II have been authenticated for combination and use, the computer II permits the combined use of the software bodies I and II.

For example, in the software use permission system, the platform generates a message I, for which a digital signature S is provided, that requests provision of the software body I, and a message II, for which a digital signature S is provided, that requests provision of the software body II. Only when the authentication of the platform based on the digital signature S is successful, the computer I provides, for the platform, the software I with a digital signature I. Only when the authentication of the platform based on the digital signature S is successful, the computer II provides, for the platform, the software II with a digital signature II. The platform authenticates the computer I and the computer II based on the digital signatures I and II provided for the software I and the software II. The platform executes the determination programs I and II only when the authentication by both the computers I and II is successful. Only when the determination programs I and II authenticate both the software I and the software II, the platform permits the combined use of the software bodies I and II.

The software use permission system may further include a different computer for performing data communication with the platform through a data communication network, wherein, in accordance with the determination program I, the platform performs data communication with a different computer via a data communication network, and performs a determination process in accordance with the determination results obtained by the different computer.

In the system, the different computer may be the computer I.

The software use permission system may further include: computers A and B, for performing data communication with the platform through the data communication network, wherein, in accordance with the program I, the platform transmits at least part of the software II to the computer A via the data communication network, wherein, based on part or all of the received software II, the computer A determines whether the combined use of the software II with the software I should be permitted, and transmits determination results I to the platform via the data communication network, wherein, in accordance with the determination program I, the platform performs a determination process based on the received determination results I; wherein, in accordance with the determination program II, the platform transmits at least part of the software I to the computer B via the data communication network, wherein, based on part or all of the received software II, the computer B determines whether the combined use of the software II with the software I should be permitted, and transmits determination results II to the platform via the data communication network, and wherein, in accordance with the determination program II, the platform performs a determination process based on the received determination results II. In this case, at the least, either the computer A may be the computer I or the computer B is the computer II, is established.

The determination program I may permit the platform to perform a process for, based on the authentication results obtained based on the digital signature attached in advance to the software II, permitting the software II to be combined and used with the software body I.

The computer I may provide software that is encrypted by using an encryption key that conforms to a public encryption method and that is generated by the platform. Upon receiving the software, the platform decrypts the software using a decryption key that is generated and is to be paired with the encryption key.

The computer I may perform a process for providing the software I in accordance with a message generated by the platform, and wherein the message includes address information indicating the location of the platform. In this case, the address information may be address information for the platform on the data communication network, and wherein, based on the address information, the software I is transmitted to the platform through the data communication network. Otherwise, the address information may indicate a geographical location of the platform.

There are some channels for providing the software to the platform. It is suggested that the platform and the computer I are connected to the data communication network, and the computer I provides the software I for the platform in accordance with a message that is generated by the platform and is transmitted to the computer I via the data communication network. It is also suggested that the platform and the computer I is connected to the data communication network, and the computer I provides the software I for the platform via the data communication network. It is also suggested that the platform and the computer I have a device for reading data from and writing data to a computer-readable removable recording medium, and the platform generates a message and writes the message to the recording medium, and the computer I provides the software I for the platform in accordance with the message read from the recording medium. It is also suggested that the platform and the computer I have a device for reading data from and writing data to a computer-readable removable recording medium, and to provide the software I, the computer I writes the software I to the recording medium, and the platform reads the software I from the recording medium.

If an IC card is included in the system, it is suggested that the recording medium is a RAM (Random Access Memory) included in an IC card. It is also suggested that the IC card includes an MPU (Micro Processing Unit) and serves as the platform.

The software body I may be included as part of the determination program I, and calling of the software body I is performed through the determination program I.

The system is for example applicable to the following combinations of the platform, the software I and the software II. In a first combination, the platform is a computer, the software I is an operating system executed by the computer or a computer program executed by the operating system, and the software II is another computer program executed by the operating system. In a second combination, the platform is a computer, the software I is an operating system executed by the computer or a computer program executed by the operating system, and the software II is data read by the operating system. In a third combination, the platform is constituted by a computer and an operating system executed by the computer, the software I and the software II are computer programs executed by the operating system. In a forth combination, the platform is constituted by a computer and an operating system executed by the computer, and the software I and the software II are data read by the operating system, or by a computer program executed by the operating system. In a fifth combination, the platform is constituted by a computer, an operating system operated by the computer and a first computer program executed by the operating system, and the software I and the software II are computer programs called by the first computer program.

The system is applicable for permitting/inhibiting combined use of three or more software products. The present invention provides a software use permission method, for permitting or inhibiting the combination and use, on a platform including a computer, of a plurality of types of software that are provided as digital electronic data, i.e., a plurality of computer programs or a plurality of sets of data, whereby the plurality of types of software are three or more types; and whereby the above-mentioned method is employed to permit or inhibit the use of at least one of combinations of two types of software from among the plurality of types.

DESCRIPTION OF THE PREFERRED EMBODIMENTS

Figure 1:
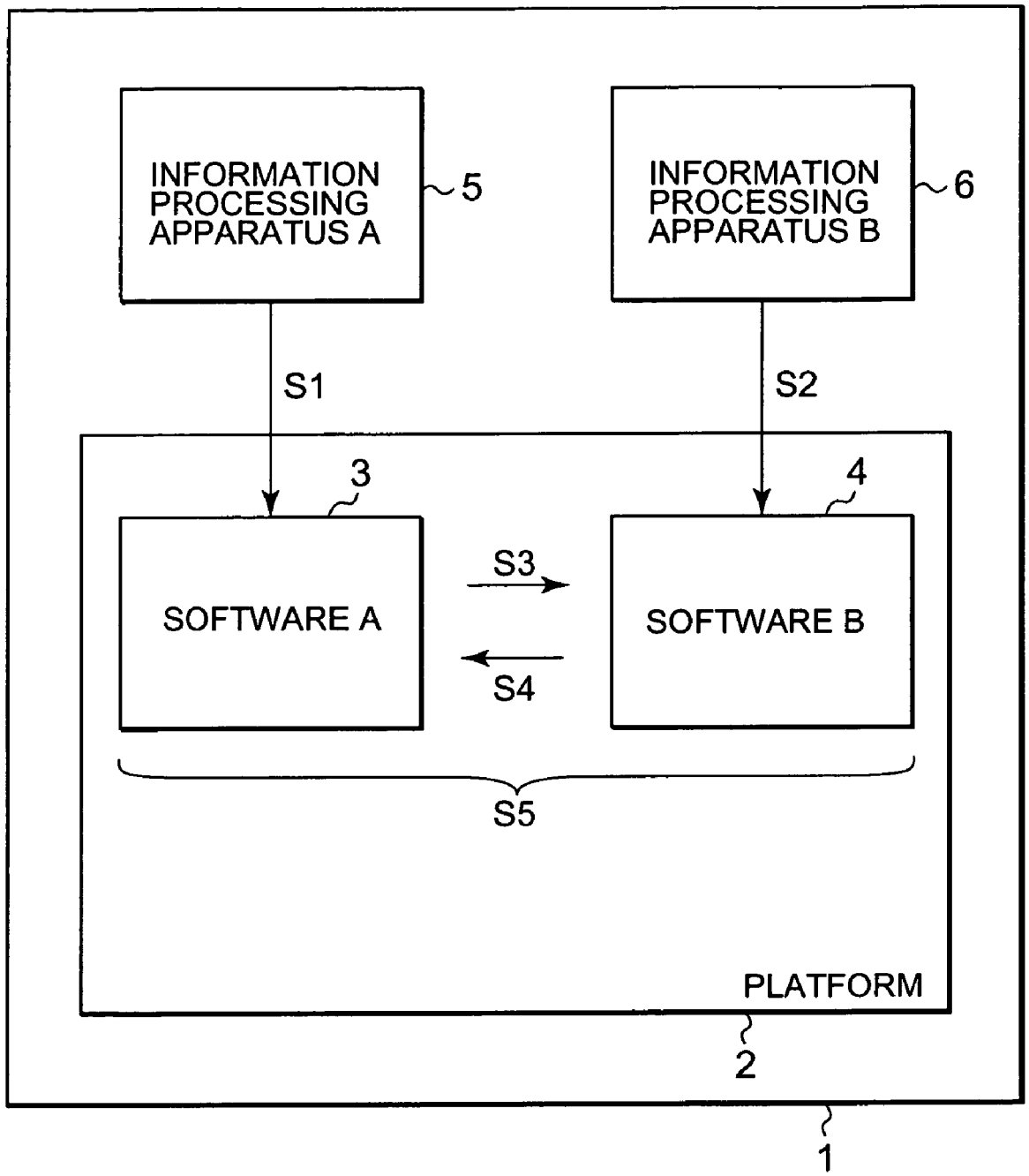
FIG. 1 is a functional block diagram showing a software use permission system according to one mode of the present invention.

A software use permission system 1 according to one mode of the present invention will now be described while referring to FIG. 1. First, the individual components of the software use permission system 1 will be described.

The software use permission system 1 includes: a platform 2, software 3 and software 4 (hereinafter sometimes referred to as software A and software B) and information processing apparatuses 5 and 6 (hereinafter sometimes referred to as information processing apparatuses A and B).

The platform 2 includes hardware, at the least, and depending on the mode, may also include an operating system (hereinafter referred to as an OS) running on the hardware, or may include not only the OS but also a computer application program (hereinafter referred to simply as a program) operating on the OS. The software 3 and the software 4 are used by the platform 2.

The hardware for the platform 2 is constituted so as to obtain a tamper-proof property. The tamper-proof hardware is hardware having physical and logical functions to protect confidential information from being leaked or altered through an external, illegal action, such as the wrenching open of a case, and to prevent an illegal access. More specifically, the platform 2 is constituted by a computer, which has a physical and electrical tamper-proof property, and an OS and a program executed by the computer, or is constituted by an IC card having a physical and electrical tamper-proof property. Either this, or the platform 2 includes an operating system having a mechanism for performing a strict process and user management to prevent unauthorized software from interfering with other software. Further, the platform 2 is provided as a system, for example, wherein a virtual machine, such as a Java (a registered trademark) VM (Virtual Machine), is included in a computer to make difficult an interference by software from outside the virtual machine. Furthermore, the platform 2 is provided as hardware, software or a combined hardware and software system that can eliminate various factors that can interfere with the authorized use of a software group.

In this invention, the software 3 and the software 4 are supposed to represent both programs and data. "Use of software" indicates that when this software is a program, the software is to be executed on a platform, and when the software is data, the software is read or rewritten by a program or an OS operating on the platform. The software 3 is provided by a software provider A, while the software 4 is provided by a software provider B differing from the software provider A.

The information processing apparatus 5 is managed by the software provider A, and automatically performs a process for determining whether the use of the software 3 with other software should be permitted. Similarly, the information processing apparatus 6 is managed by the software provider B, and automatically performs a process for determining whether the use of the software 4 with other software should be permitted.

In the thus arranged software use permission system 1, before the software 3 and the software 4 are employed together, by the platform 2, the trust between the platform 2 and the software 3, the platform 2 and the software 4, and the software 3 and the software 4 is examined, and only when the trust for all these has been verified, the combined use, on the platform 2, of the software 3 and the software 4 is permitted.

The process for the use permission is performed at the following steps A to E.

First, the software providers A and B employ the information processing apparatuses A and B to verify the platform 2, and only when the platform 2 has been authenticated, the software providers A and B supply the software A and the software B to the platform 2.

(Step A) The information processing apparatus A authenticates the platform 2 to confirm, from the viewpoint of the software provider A, the trustworthiness of the platform 2.

Specifically, the information processing apparatus A authenticates a digital signature provided by the platform 2.

The information processing apparatus A may be connected to the platform 2, which includes a rewriting disabled recording medium on which an inherent identification symbol is written, and may authenticate the platform 2 by reading the identification symbol.

When the verification is successful and the trustworthiness has been confirmed, the software provider A supplies, to the platform 2, the software A in a form that can not be employed, or will be difficult to be employed, by any system other than the platform 2.

To supply the software A in a form that can not be employed, or will be difficult to be employed, by a system other than the platform 2, the software A is encrypted before being provided. When public-key encryption is employed, an encryption key for the platform 2 is transmitted in advance to the information processing apparatus A.

The software A can be supplied to the platform 2 through data communication via a network, or can be obtained from a removable recording medium, such as a CD-ROM, by the reader provided for the platform 2.

(Step B) Similarly to step A, the information processing apparatus B authenticates the platform 2 to confirm the trustworthiness of the platform 2 from the viewpoint of the software provider B. When the trustworthiness is confirmed, the software provider B supplies, to the platform 2, the software B in a form that can not be used, or is difficult to be used, by a system other than the platform 2. The form of the software B and the supply route are the same as those at step A.

Then, the platform 2 performs a process to enable the software A and the software B to trust each other.

(Step C) The platform 2 permits the software A to verify the software B in order to determine whether the software A trusts the software B.

To permit the software A to authenticate the software B, an authentication program, which permits the platform 2 to authenticate software to be combined, is installed in the software A, and the platform 2 executes the authentication program before the software A is used. The authentication program obtains, from the software B, information required for the authentication, determines whether the software B should be authenticated, and examines its trustworthiness based on the results obtained.

The authentication program may transmit the required information that is obtained to another information processing apparatus, such as the information processing apparatus A, and may receive the authentication results from the information processing apparatus A. In this case, the information processing apparatus A is in charge of the software authentication process.

(Step D) In the same manner as at step C, the platform 2 permits the software B to verify the software A and confirms that the software B trusts the software A.

(Step E) Only when it is determined at steps C and D that both the software A and the software B trust each other, the combined use of the software A and the software B on the platform 2 is permitted, and the software A and the software B are actually combined and used, as needed.

What is meant by the combined use of the software A and the software B follows. When both the software A and the software B are programs, the computer performs a process whereby the output of one is used as the input for the other. When either the software A or the software B is a program and the other is data, the computer reads the data in accordance with the program and performs a predetermined process, and rewrites the data, as needed. When both the software A and the software B are data, the OS, or a program being run by the OS, reads the data and performs a predetermined process, and rewrites either one or both sets of the data, as needed.

The software A and the software B are either OSs, programs including OSs, or other programs or data employed by programs, including OSs. These combinations will now be explained while referring to FIGS. 2A to 2F. Arrows in FIGS. 2A to 2F connect the software A and the software B that confirm they trust each other and that they are to be combined and employed. Each hatched portion represents a platform.

Figure 2A:
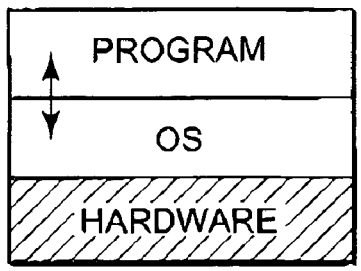
FIGS. 2A to 2F are diagrams for explaining platform types and software types to be combined and used according to the invention.

In FIG. 2A, the platform is hardware, and an OS and a program are the software A and the software B. The combined use of the software A and the software B represents the execution of the program by the OS.

Figure 2B:
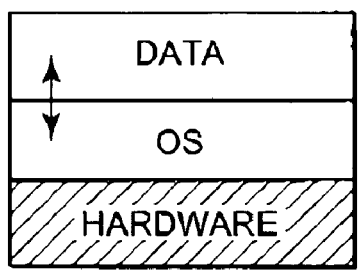

In FIG. 2B, the platform is hardware, and an OS and data are the software A and the software B. The combined use represents the accessing of the data by the OS, i.e., the reading, updating or deletion of the data.

Figure 2C:
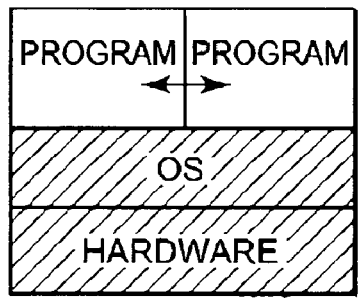

In FIG. 2C, an OS and hardware are a platform, and two programs executed by the OS are the software A and the software B. The combined use represents the operation of one program in accordance with an instruction issued by the other program. Specifically, the programs are an application program and a software program for charging for the application program, for example, a game program that charges a fee that differs depending on a playing period, and a communication program that transmits charge information to a credit card company. As another example combination, the programs are an image editing program and a reading/writing library prepared for each image format.

Figure 2D:
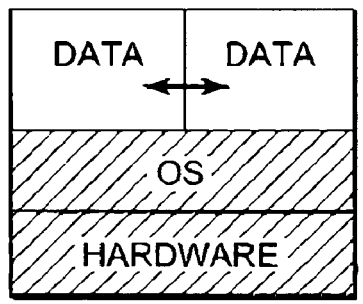

In FIG. 2D, an OS and hardware are a platform, and two sets of data referred to by the OS are the software A and the software B. The combined use represents, for example, the operation of the OS to read the two sets of data, and the copying of the contents of one set of data to the other set, changing the contents of one set of data based on the other set, or synthesizing the two sets of data.

Figure 2E:
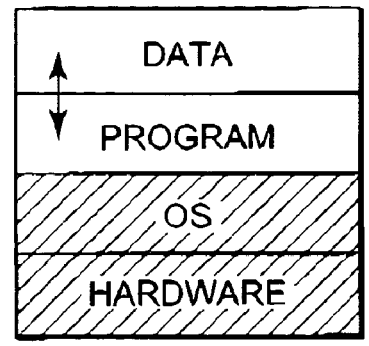

In FIG. 2E, an OS and hardware are a platform, and a program to be executed by the OS and data to be referred to by the program are the software A and the software B. The combined use represents the execution of the program while referring to the data, e.g., the display, reproduction, editing, updating or conversion of data. An example combination is one consisting of music data and a player program for reproducing the music data.

Figure 2F:
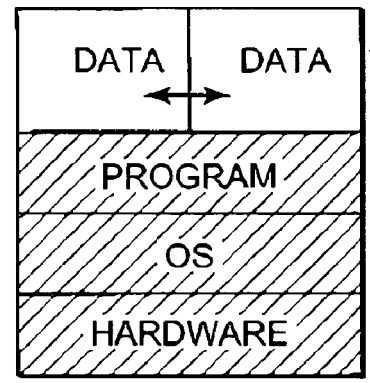

In FIG. 2F, a program, an OS and hardware are a platform, and two sets of data to be referred to by the program are the software A and the software B. The combined use represents an operation wherein the program reads the two sets of data and copies the contents of one set to the other set, changes the contents of one set of data based on the other set, or synthesizes the two sets of data. An example combination is one consisting of map data for a car navigation system and data for traffic congestion information.

According to this software use permission system 1, when the software provider A does not trust the software provider B, authentication of the software B for use with the software A can be prevented. Further, when the software provider B does not trust the software provider A, authentication of the software A for use with the software B can be prevented.

In addition, when the software provider A does not trust the safety of the platform, the use of the software A on the platform can be prevented. Similarly, when the software provider B does not trust safety of the platform, the use of the software B on the platform can be prevented.

For the transmission of a message requesting the distribution or the writing of software, the route from the platform to the information processing apparatus may be the same or may differ from a route from the information processing apparatus to the platform. For example, a route via a network can be employed both ways, a route via a network can be one way and a route via a recording medium can be the other way, or a route via a recording medium can be employed both ways. When a route via a network is employed both ways, a network for the transmission of a message may be the same or may differ from a network for the transmission of software.

First Embodiment

Figure 3:
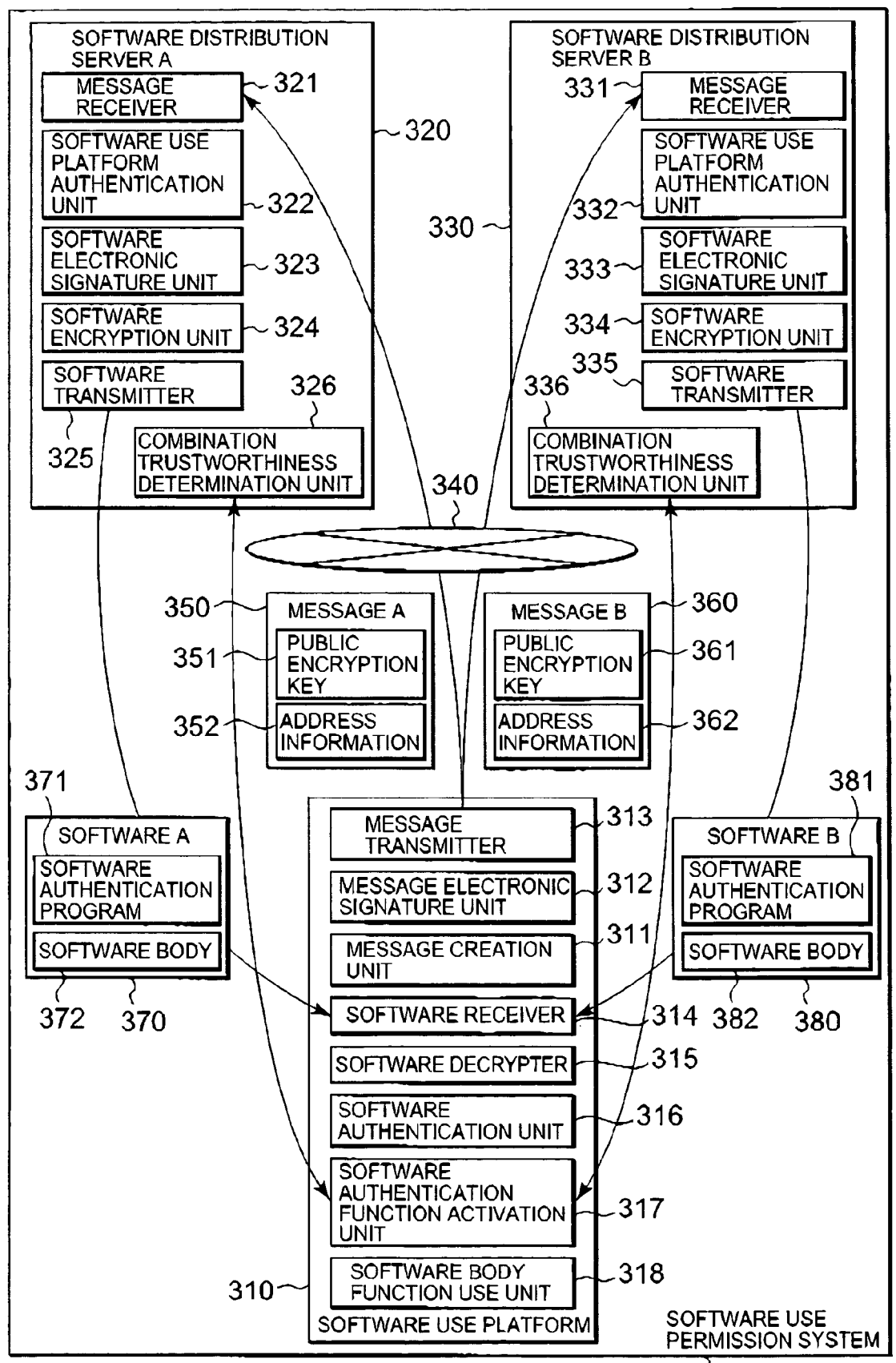
FIG. 3 is a functional block diagram showing a software use permission system according to a first embodiment of the present invention.

A software use permission system 300 according to a first embodiment will now be described while referring to FIG. 3. The software use permission system 300 includes a software use platform 310, software distribution servers 320 and 330, and a network 340 connecting these components. The software use platform 310 creates messages 350 and 360 during an operation, and transmits the messages 350 and 360 to the software distribution servers 320 and 330 via the network 340. Upon receiving the messages 350 and 360, the software distribution servers 320 and 330 distribute software 370 and software 380 to the software use platform 310. The software 370 includes a software authentication program 371 and a software body 372, and the software 380 includes a software authentication program 381 and a software body 382. The software 370 and the software 380 are encrypted with appended digital signatures representing provision sources.

In the following explanation, in order to clearly identify correlations, the software distribution server 320, the message 350, the software 370, the software authentication program 371 and the software body 372 are also called a software distribution server A, a message A, software A, a software authentication program A and a software body A, and the software distribution server 330, the message 360, the software 380, the software authentication program 381 and the software body 382 are also called a software distribution server B, a message B, software B, a software authentication program B and a software body B. A provider for the software A and a provider for the software B are called a software provider A and a software provider B.

The software use platform 30 corresponds to the platform 2 in FIG. 1, and includes a message creation unit 311, a message electronic signature unit 312, a message transmitter 313, a software receiver 314, a software decrypter 315, a software authentication unit 316, a software authentication function activation unit 317 and a software body function use unit 318. These sections can be provided by a computer, such as a personal computer, a PDA (Personal Data Assistant) or a cellular phone that includes an interface for a network connection, and an OS, or can be obtained when a program executed by the OS provides the corresponding functions. The hardware of the software use platform 310 has a physical and electrical anti-tamper property.

The message creation unit 311 creates the messages 350 and 360 (A and B) used to request the distribution of the desired software A and software B by the software distribution servers A and B. The messages 350 and 360 are electronic information, and can be transmitted via the network 340.

The message 350 is electronic information including a public encryption key 351 and address information 352. The public encryption key 351 is an encryption key consonant with a public-key encryption method, and the address information 352 is address information for the network 340 indicating the destination for the distribution of the software A to the software use platform 310. When the network 340 is, for example, the Internet, the address information 352 is the IP address of the software use platform 300.

The message 360 is electronic information including a public encryption key 361 and address information 362. The public encryption key 361 is an encryption key consonant with a public-key encryption method, and the address information 362 is address information for the network 340 indicating the destination for the distribution of the software B to the software use platform 310. When the network 340 is, for example, the Internet, the address information 352 is the IP address of the software use platform 310.

The electronic message signature unit 312 appends, to the messages 350 and 360, the digital signature for the software use platform 300 or the user thereof. The digital signature technique is a signature system, using the public-key method, that certifies the creator of data and guarantees that the data has not been altered.

The message transmitter 313 transmits to the software distribution servers A and B, via the network 340, the messages 350 and 360 to which the digital signature has been appended by the electronic signature unit 312.

The software receiver 314 receives the software 370 and the software 380 via the network 340.

The software decrypter 315 employs a secret decryption key 351D (not shown) that is paired with the public encryption key 351 to decrypt the software 370 encrypted by the software distribution server 320. Further, the software decrypter 315 employs a secret decryption key 361D (not shown) that is paired with the public encryption key 361 to decrypt the software 380 encrypted by the software distribution server 320.

Based on the digital signatures thus appended, the software authentication unit 316 specifies the sources for providing the software A and the software B, and indicates that the software A and the software B have been altered. Thus, the software authentication unit 316 confirms the trustworthiness of the software A and the software B.

The software authentication function activation unit 317 activates the software authentication program 371, i.e., the software authentication program A. The software authentication program A is an operation that employs, as the input, part or all of the binary code representing the software 380, i.e, the software B. In accordance with the output of the software B, the software authentication program A confirms the trustworthiness of the software B. Similarly, the software authentication function activation unit 317 activates the software authentication program 381, i.e., the software authentication program B. The software authentication program B is an operation that employs, as the input, part or all of the binary code representing the software 370, i.e., the software A. In accordance with the output of the software authentication program B, the software authentication function activation unit 317 confirms the trustworthiness of the software A.

The software body function use unit 318 combines and employs the software A and the software B. Since the combined use of the software has already been explained while referring to FIGS. 2A to 2F, no further explanation for it will be given.

The software distribution server 320 corresponds to the information processing apparatus 5 in FIG. 1, and includes a message receiver 321, a software use platform authentication unit 322, a software electronic signature unit 323, a software encryption unit 324, a software transmitter 325 and a combination trustworthiness determination unit 326. The software distribution sever 320 includes an interface for network connection, and is provided by a computer connected to the network 340 and an OS executed by the computer, and various programs executed by the OS. For the location at which the software distribution server 320 is installed, it is preferable that adequate security measures be applied and maintained.

The message receiver 321 receives the message 350 from the message transmitter 313 via the network 340.

The software use platform authentication unit 322 accepts the message 350 received by the message receiver 321, authenticates the software use platform 300 or the user thereof, based on a digital signature provided for the message 350 by the message electronic signature unit 312, and confirms that the message 350 has not been altered. Thus, the trustworthiness of the software use platform 300 can be confirmed.

The software electronic signature 323 provides a digital signature for the software A by using a public-key method.

The software encryption unit 324 employs the public encryption key 351 to encrypt the software A to which the digital signature has been appended.

In accordance with the address information 352, the software transmitter 325 transmits to the software receiver 314, via the network 340, the encrypted software A to which the digital signature has been appended.

The combination trustworthiness determination unit 326 examines the software to be used with the software A to determine whether it is trustworthy.

The software distribution server 330 corresponds to the information processing apparatus 6 in FIG. 1, and includes a message receiver 331, a software use platform authentication unit 332, a software electronic signature unit 333, a software encryption unit 334, a software transmitter 335 and a combination trustworthiness determination unit 336. The software distribution server 330 includes an interface for a network connection, and is provided by a computer connected to the network 340, an OS executed by the computer and various programs executed by the OS. For the location at which the software distribution server 320 is installed, it is preferable that adequate security measures be applied and maintained.

The message receiver 331 receives the message 360 from the message transmitter 313 via the network 340.

The software use platform authentication unit 332 accepts the message 360 received by the message receiver 331, authenticates the software use platform 300 or the user thereof, based on a digital signature appended to the message 360 by the message electronic signature unit 312, and confirms that the message 360 has not been altered. Thus, the trustworthiness of the software use platform 300 can be confirmed.

The software electronic signature unit 333 provides a digital signature for the software B.

The software encryption unit 334 employs the public encryption key 361 to encrypt the software B to which the digital signature has been appended.

In accordance with the address information 362, the software transmitter 335 transmits, to the software receiver 314, via the network 340, the encrypted software B to which the digital signature has been appended.

The combination reliability determination unit 336 examines the trustworthiness of the software to be combined and used with the software A.

The network 340 is an information communication network via data can be exchanged, and may be the Internet, a LAN (a Local Area Network), a public phone network, a mobile communication network, or a combination of these networks.

The software 370, i.e., the software A, is composed of the software authentication program 371 and the software body 372. The software authentication program 371 is a computer program that is activated and executed by the software authentication function activation unit 317, and that employs, as input, part or all of the binary code representing the software 380, i.e., the software B. In accordance with the output of the authentication program 371, the trustworthiness of the software B is confirmed.

Similarly, the software 380, i.e., the software B, is composed of the software authentication program 381 and the software body 382. The software authentication program 381 is a computer program that is activated and executed by the software authentication function activation unit 317, and that employs, as input, part or all of the binary code representing the software 370, i.e., the software A. In accordance with the output of the software authentication program 381, the trustworthiness of the software A is confirmed.

Next, an explanation will be given for the operation of the software use permission system 300 for permitting the combined use, on the software use platform 310, of the software body 372 (A) and the software body 382 (B), which are respectively provided by the software provider A and the software provider B.

Assume that unique network addresses for the network 340 are allocated in advance for the software use platform 310, the software distribution server 320 (A) and the software distribution server 330 (B).

Figure 4:
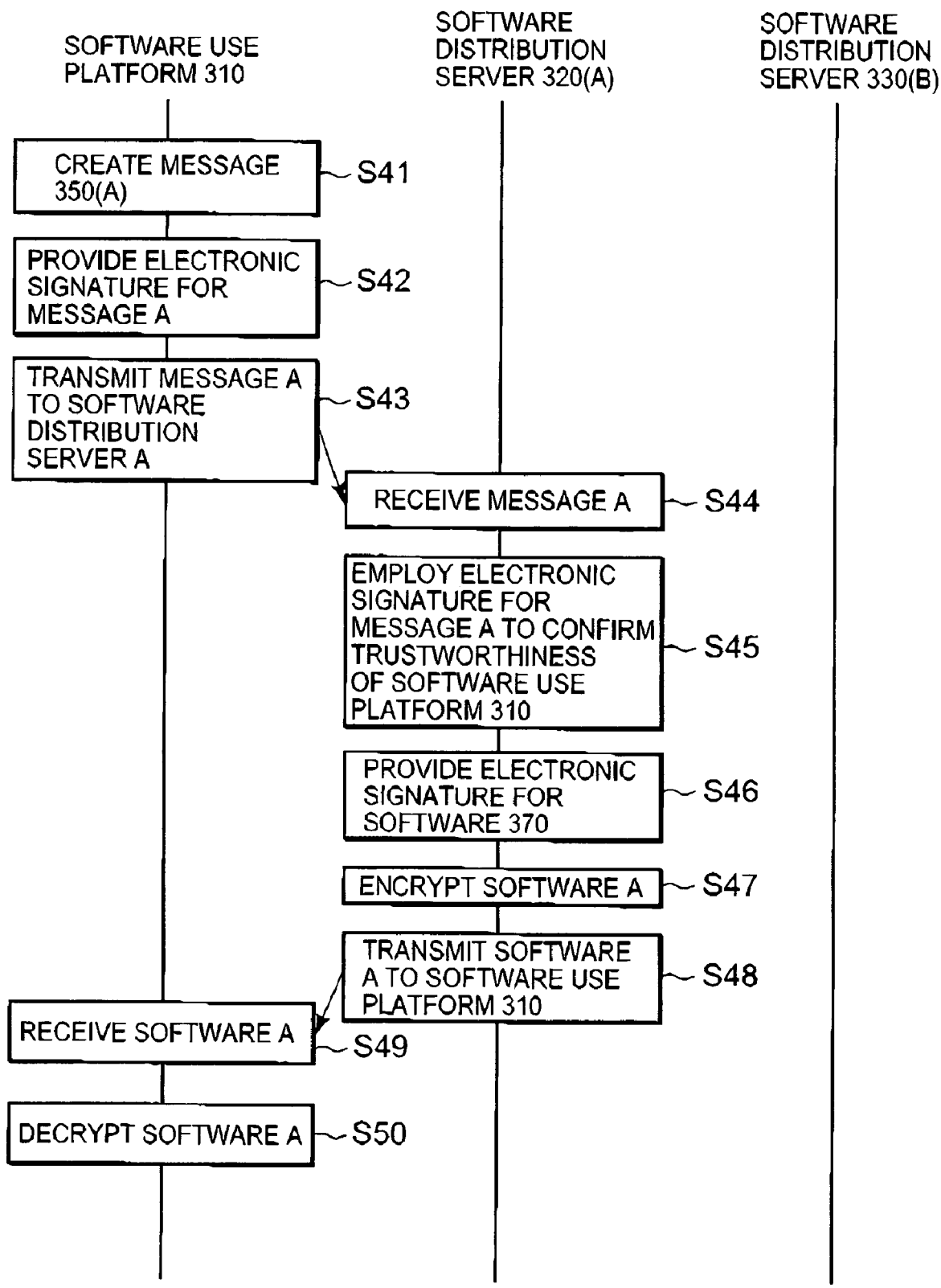
FIG. 4 is a flowchart for explaining the operation of the software use permission system in the first embodiment.

While referring to FIG. 4, an explanation will be given for the processing whereby the software use platform 310 requests the distribution, by the software distribution server A, of the software 350 (A) and receives the software 350 (A).

In the software use platform 310, the message creation unit 311 creates the message 350 (A), which is electronic information that includes the public encryption key 351 (A) and the address information 352 (A) (step S41). The secret decryption key 351D, which is generated with the public encryption key 351, is transmitted to the software decrypter 315.

The thus prepared message A is transmitted to the message electronic signature unit 312, and a digital signature is appended to the message A (step S42).

The message A, to which the digital signature has been appended, is transmitted by the message transmitter 313, via the network 340, to the message receiver 321 (A) of the software distribution server A (step S43).

The message A, to which the digital signature has been appended, is received by the message receiver A (step S44) and is transmitted to the software use platform authentication unit 322 (A). The software use platform authentication unit A employs the digital signature appended to the message A to determine whether the software use platform 310, which is the transmission source, is trustworthy (step S45).

When it is determined that the software use platform 310 is not trustworthy, the software distribution server A does not transmit the software A. However, instead of inhibiting the transmission, another response message may be transmitted to the software use platform 310, or software A including a version that limits the functions of the software A may be transmitted to the software use platform 310.

When it is determined that the software use platform 310 is trustworthy, the software distribution server A begins preparations for the distribution of the software A.

Since the software A that includes the software authentication program 371 (A) and the software body 372 (A) is stored in advance in an external storage device (not shown), such as a permanent magnetic disk drive, for the software distribution server A, the software electronic signature unit 323 (A) copies the software A from the external storage device and provides, for the software A, a digital signature representing either the software provider A or the software distribution server A (step S46).

Then, the software encryption unit 324 (A) employs the public encryption key 351, which is included in the message A received at step S44, to encrypt the software A to which the digital signature has been appended (step S47).

The software transmitter 325 then transmits to the software use platform 310, via the network 340, the encrypted software A to which the digital signature has been appended (step S48).

At the software use platform 310, the software receiver 314 receives the software A (step S49), and the software decrypter 315 decrypts the software A (step S50). For this decrypting, the secret decryption key 351D generated at step S41, and paired with the public encryption key 351, is employed.

Figure 5:
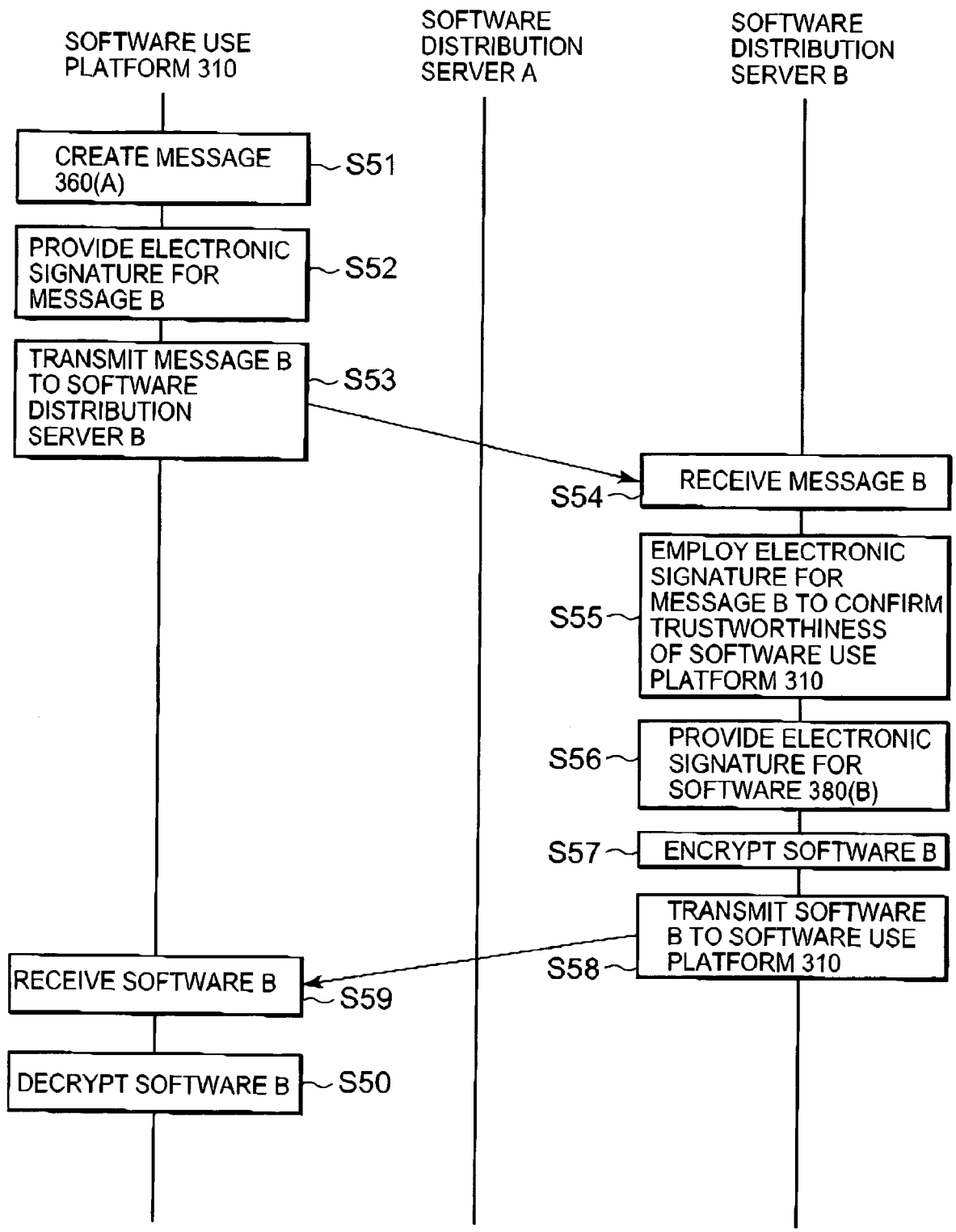
FIG. 5 is a flowchart for explaining the operation of the software use permission system in the first embodiment.

While referring to FIG. 5, an explanation will now be given for the processing whereby the software use platform 310 requests the distribution, by the software distribution server B, of the software 360 (B) and receives the software 360 (B). Basically the same operation is performed, with A and B merely being reversed.

In the software use platform 310, the message creation unit 311 creates the message 360 (B), which is electronic information that includes the public encryption key 361 (B) and the address information 362 (B) (step S51). The secret decryption key 361D, which is generated with the public encryption key 361, is transmitted to the software decrypter 315.

The thus prepared message B is transmitted to the message electronic signature unit 312, and a digital signature is provided for the message B (step S52).

The message B, to which the digital signature has been attached, is transmitted by the message transmitter 313, via the network 340, to the message receiver 331 (B) of the software distribution server B (step S53).

The message B, to which the digital signature has been appended, is received by the message receiver B (step S54) and transmitted to the software use platform authentication unit 332 (B). The software use platform authentication unit B employs the digital signature appended to the message B to determine whether the software use platform 310, which is the transmission source, trustworthy (step S55).

When it is determined that the software use platform 310 is not trustworthy, the software distribution server B does not transmit the software B. However instead of inhibiting the transmission, another response message may be transmitted to the software use platform 310, or software B that including a version that limits the function of the software B may be transmitted to the software use platform 310.

When it is determined that the software use platform 310 is trustworthy, the software distribution server B begins preparations for the distribution of the software B.

Since the software B that includes the software authentication program 381 (B) and the software body 382 (B) is stored in advance in an external storage device (not shown), such as a permanent magnetic disk drive, for the software distribution server B, the software electronic signature unit 333 (B) copies the software B from the external storage device, and provides, for the software B, a digital signature representing the software provider B or the software distribution server B (step S56).

Then, the software encryption unit 334 (B) employs the public encryption key 351, which is included with the message B received at step S54, to encrypt the software B to which the digital signature has been appended (step S57).

The software transmitter 335 transmits to the software use platform 310, via the network 340, the encrypted software B to which the digital signature has been attached (step S58).

At the software use platform 310, the software receiver 314 receives the software B (step S59), and the software decrypter 315 decrypts the software B (step S60). The secret decryption key 361D that is generated at step S51 and paired with the public encryption key 361 is employed for this decrypting.

Figure 6:
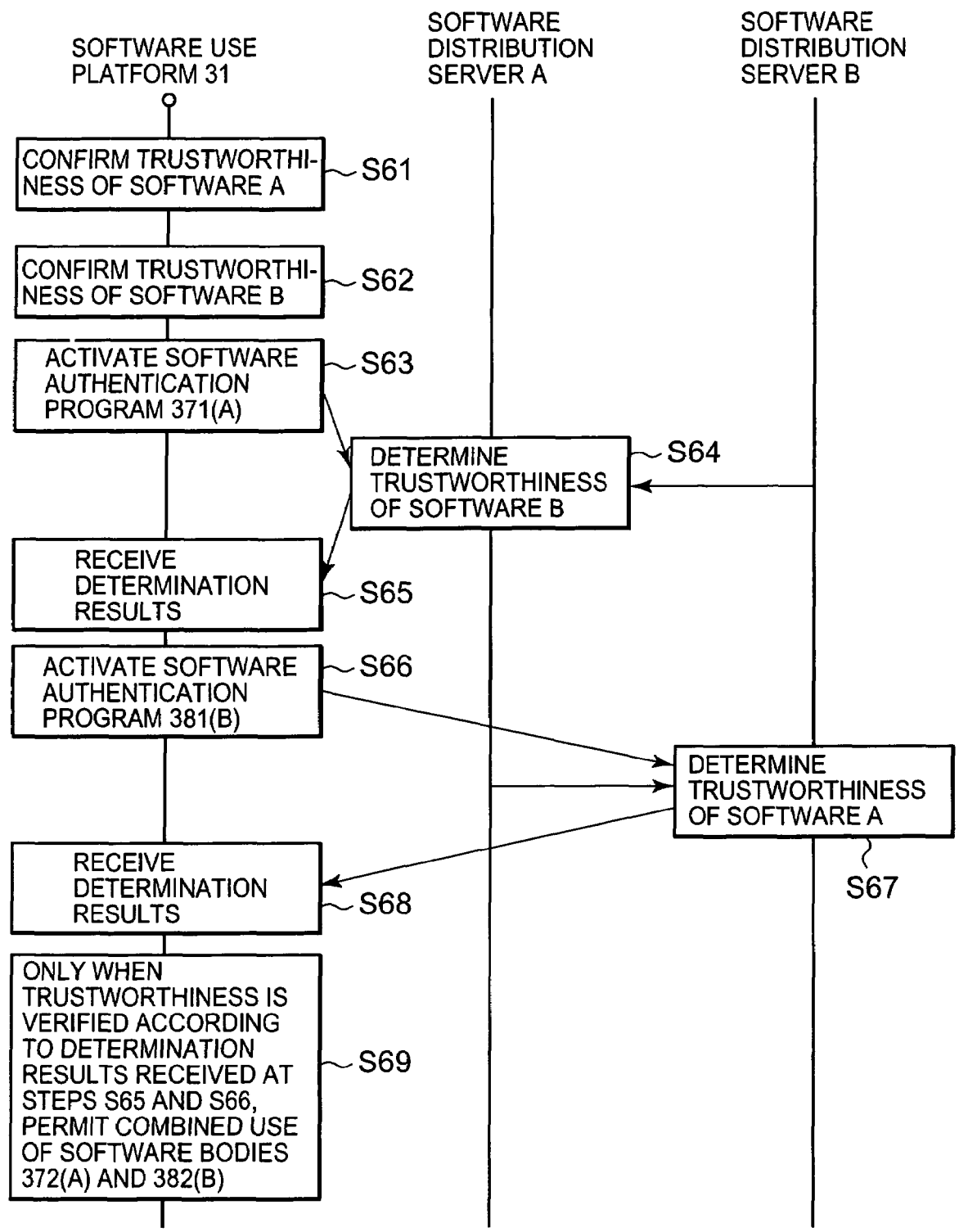
FIG. 6 is a flowchart for explaining the operation of the software use permission system in the first embodiment.

Following this, while referring to FIG. 6, an explanation will be given for the processing wherein the software use platform 310 authenticates the combined use of the software A and the software B that have been received.

After the software use platform 310 receives and decrypts the software A and the software B, the software authentication unit 316 confirms the trustworthiness of the software A and the software B based on the digital signatures appended to the software A and B (step S61 and S62).

As for a software body included in the software for which the trustworthiness was not confirmed, the use of this software is limited by the software use platform 310. As an example limitation, when the software is a program, execution of the program is not permitted, or the rewriting of data by the program is not permitted while execution of the program is permitted. As another example, the use of the software is permitted without any limitations when the software is to be combined and used with software for which the determination of trustworthiness, as in this invention, is not requested or when the software is to be executed independently, but the use of the software is inhibited when the software is to be combined and used with software for which the determination of the trustworthiness, as in this invention, is requested. As an additional example, when the software is data, all data access is inhibited, or the rewriting and deletion of the data is inhibited and only reading is permitted.

When the trustworthiness is confirmed for both the software A and the software B, the software authentication function activation unit 317 runs the software authentication program A on the software use platform 310 (step S63). In accordance with the software authentication program A, the software use platform 310 reads the software B decrypted at step S60, and transmits part or all of the software B to the software distribution server A. When part of the software B is to be read, for example, only the body of the software B may be transmitted, or one or multiple bit strings may be designated in advance, in the binary code constituting the software B, and be transmitted.

When the software distribution server A has received part or all of the software B, the combination trustworthiness determination unit 326 determines whether the software B should be authenticated as software to be combined and used with the software A (step S64).

Through data communication performed in advance, or in accordance with the software B received from the software use platform 310, the software distribution server A receives part or all of the software B that is used as a reference for determination. The software B used as a determination reference and other software may be registered in a database so that the software distribution server A can access and obtain them from the database.

The thus obtained software B that is used as a determination reference is compared with the software B received from the software use platform 310. When the software B matches, the combination trustworthiness determination unit 326 transmits to the software use platform 310 a signal indicating that the combined use of the software B with the software A is permitted. This permission indicates that the software provider A has authenticated the software B to be combined and used with the software A. When the software B does not match, the combination trustworthiness determination unit 326 transmits, to the software use platform 310, a signal indicating inhibition of the use.

When a permission signal is received, the software authentication function activation unit 317 determines that the software B has been authenticated and is to be combined and used with the software A (step S65). When an inhibiting signal is received, the software authentication function activation unit 317 determines that the software B has not been authenticated. At this time, when the trustworthiness is confirmed at step S61, the software use platform 310 does not limit the independent use of the software A, but limits the use of the software A with the software B.

When the software A and the software B are programs, as the limitation, the software use platform 310 can inhibit part or all of the program transmission by the software B to the software A executed by the software use platform 310. When the software A is a program and the software B is data, the software use platform 310 can inhibit the opening of the software B by the software A, or can inhibit the rewriting of data. When the software A is data and the software B is a program, the software use platform 310 can partially or completely inhibit the reading or the rewriting of the software A by the software B.

Sequentially, the software authentication function activation unit 317 performs the same processing by reversing the software A and the software B. Specifically, the software authentication function activation unit 317 runs the software authentication program B on the software use platform 310 (step S66). In accordance with the software authentication program B, the software use platform 310 reads the software A decrypted at step S60, and transmits part or all of the software A to the software distribution server B. When part of the software A is to be read, for example, only the body of the software A may be transmitted, or one or multiple bit strings in the binary code constituting the software A may be designated in advance and transmitted.

When the software distribution server B has received part or all of the software A, the combination trustworthiness determination unit 336 determines whether the software A should be authenticated as software to be combined and used with the software B (step S67).

Through data communication performed in advance, or in accordance with the software A received from the software use platform 310, the software distribution server B receives part or all of the software A that is used as a reference for determination. The software A used as a determination reference and other software may be registered in a database so that the software distribution server B can access and obtain them from the database.

The thus obtained software A that is used as a determination reference is compared with the software A received from the software use platform 310. When the software A matches, the combination trustworthiness determination unit 336 transmits, to the software use platform 310, a signal indicating that the combined use of the software A with the software B is permitted. This permission indicates that the software provider B has authenticated the software A to be combined and used with the software B. When the software A does not match, the combination trustworthiness determination unit 336 transmits to the software use platform 310 a signal indicating inhibition of the use.

When a permission signal is received, the software authentication function activation unit 317 determines that the software A has been authenticated for combination and use with the software B (step S68). When an inhibiting signal is received, the software authentication function activation unit 317 determines that the software A has not been authenticated. At this time, when the trustworthiness is confirmed at step S62, the software use platform 310 does not limit the independent use of the software B, but limits the use of the software B with the software A. Since the contents of this limitation are the same as explained at step S65, no further explanation for them will be given.

After the software authentication function activation unit 317 has determined the trustworthiness of the software A and the software B, the software body function use unit 318 employs the software A and the software B in accordance with the determination results (step S69). When a permission signal is received at steps S65 and S68, the software body function use unit 318 places no limitations on the combined use of the software A and the software B. When an inhibiting signal is received at either step S65 or step S68, or at both steps, the software body function use unit 318 imposes the above described limitation for the combined use of the software A and the software B.

The effects of the software use permission system 300 will now be described.

The software distribution servers A and B authenticate the software use platform 310 based on the digital signatures appended to the software A and the software B, and distribute the software A and the software A only when the authentication is successful. Therefore, the distribution of the software A and the software B to another computer that imitates the software use platform 310 can be prevented.

In addition to the authentication based on the digital signature, a database wherein authorized users are registered in advance may be examined to determine whether a user identified by a digital signature is an authorized user for the software A and the software B, and the software A and the software B may be transmitted only when the user is determined to be the authorized user. In this manner, the use of software by an unauthorized user can be avoided at this stage.

Furthermore, before the software A is used, the software authentication program A is executed to determine whether the software B should be authenticated for combination and use with the software A. Since this determination process is performed by the software distribution server A, the skipping of the determination process by the software use platform 310 can be prevented. The same thing can be applied for the software B.

In the above explanation for the first embodiment, the software use permission system has been employed for the combined use of two types of software, i.e., the software A and the software B. However, it will be obvious to one having ordinary skill in the art that this system can also be applied for the combined use of three or more types of software.

According to the first embodiment, the two software distribution servers A and B respectively distribute the software A and the software B to the software use platform 310 at steps S41 to S50 and at steps S51 to S60. Thereafter, in accordance with the software authentication programs A and B, the software use platform 310 performs a process for determining the trustworthiness of the software to be combined and used, and only when the software A or B is trustworthy from the viewpoint of the other software B or A (i.e., from the viewpoint of the corresponding software provider), permits the combined use of the software A and the software B.

Likewise, when three or more types of software are to be combined and used, software distribution servers equivalent in number to the types of software are prepared, and the same processing at steps S41 to S50 is performed by these software distribution servers and the software use platform. Furthermore, a software authentication program for each of the software types performs a process for determining the trustworthiness of other software to be combined and used with the software. When from the viewpoints of all the other software the software is reliable, any combined use of any of the software is permitted.

In addition, in the explanation for the first embodiment, the software provider A or B provided only one type of software A or software B. However, the software providers A and B may provide a plurality of types of software. In this case, the messages A and B include information for designating the software type.

Further, in the first embodiment, the software 370 and the software 380 are distributed by the software transmitters 325 and 335, via the network 340, to the software receiver 314. However, another distribution route may be employed. For example, the software 370 and the software 380 may be written to a removable non-rewritable recording medium, such as a CD-ROM, and may be read from the recording medium by the software use platform 310. In this case, the address information 352 and the address information 362 indicates, for example, the prefecture, the city and the lot number that represents the actual location of the software use platform 310.

Second Embodiment

Figure 7:
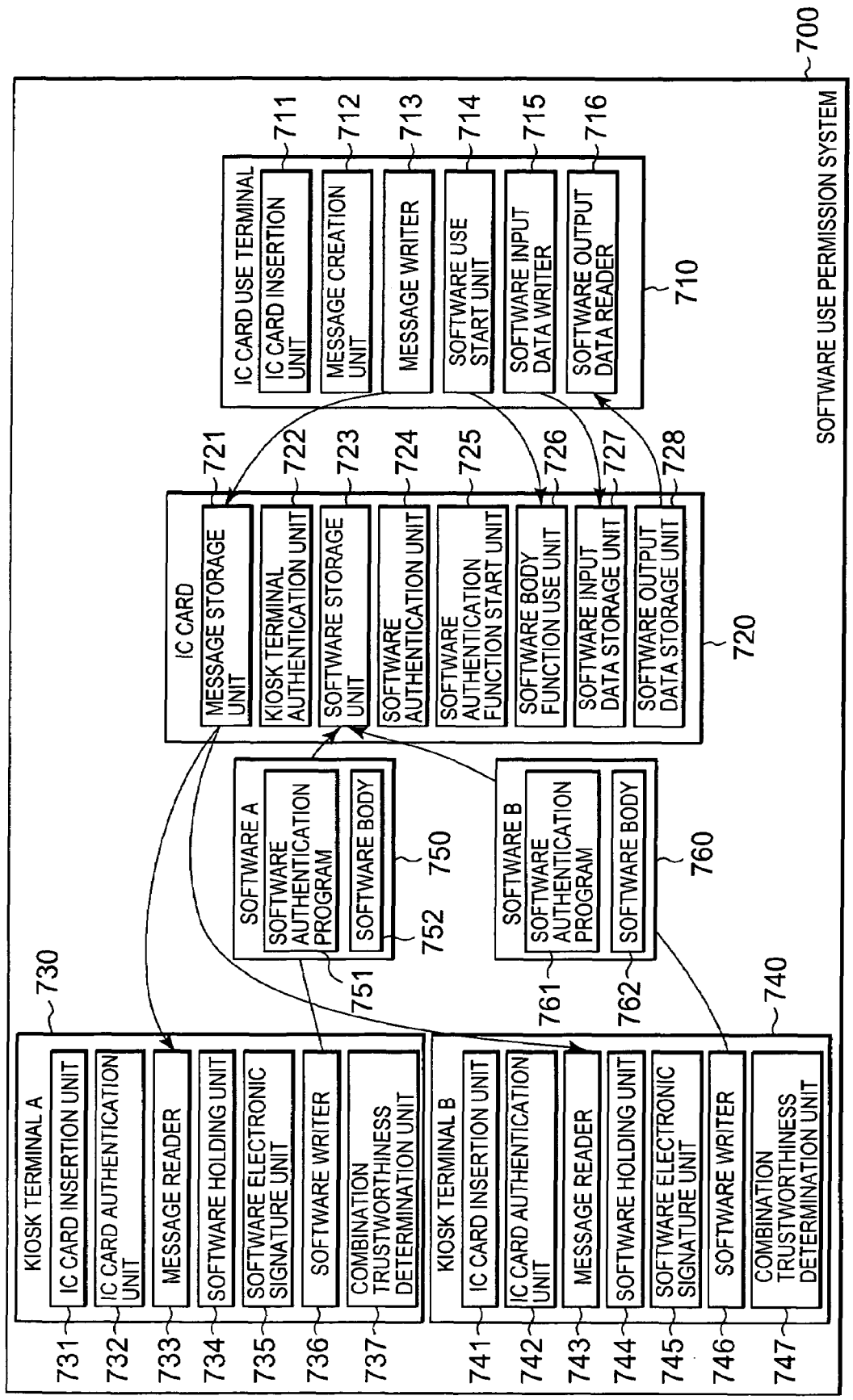
FIG. 7 is a flowchart for explaining the operation of the software use permission system in the first embodiment.

A software use permission system 700 will now be described according to a second embodiment of the present invention while referring to FIG. 7. The software use permission system 700 includes: an IC card use terminal 710, an IC card 720, a kiosk terminal 730 and a kiosk terminal 740. The kiosk terminal 730 distributes software 750 provided by a software provider A, and the kiosk terminal 740 distributes software 760 provided by a software provider B. Hereinafter, the kiosk terminal 730 and the kiosk terminal 740 may be called a kiosk terminal A and a kiosk terminal B, and the software 750 and the software 760 may be called software A and software B. The IC card use terminal 710 and the kiosk terminals 730 and 740 are terminal devices that can exchange data via a data communication network (not shown), such as the Internet.

The IC card use terminal 710 corresponds to the platform 2 in FIG. 1, and is provided by: a computer that includes an input device, such as a keyboard or a mouse, an IC card reader/writer, a network interface for connection to a data communication network, such as the Internet, and an external storage device, such as a permanent magnetic disk drive; and an OS and programs operated by the computer. The IC card use terminal 710 includes an IC card insertion unit 711, a message creation unit 712, a message writer 713, a software use start unit 714, a software input data writer 715 and a software output data reader 716.

When the IC card 720 is loaded into the IC card reader/writer, the IC card insertion unit 711 detects this insertion and sets the IC card use terminal 710 for the reading of the IC card 720.

The message creation unit 712 designates software to be used by the IC card use terminal 710, and creates electronic information as a message to the kiosk terminal that distributes the software, requesting that the software be written to the IC card 720.

The message writer 713 employs the IC card reader/writer to write, to the memory of the IC card 720, the message created by the message creation unit 712.

The software use start unit 714 notifies the IC card 720 of the use of the software written on the IC card 720.

When the software written on the IC card 720 is to be used, the software input data writer 715 writes, to the IC card 720, data to be provided for the software.

When the software written on the IC card 720 is to be used, the software output data reader 716 reads from the IC card 720 data output by the software.

The IC card 720 constitutes part of the platform 2, and also serves as a medium for the software transmitted between the information processing apparatuses 5 and 6 and the platform 2. The IC card 720 is a so-called smart card that at the least includes: an MPU (Micro Processing Unit); a ROM used to store an OS that controls the operation of the MPU; and a RAM to be accessed by the MPU. The IC card 720 includes a message storage unit 721, a kiosk terminal authentication unit 722, a software storage unit 723, a software authentication unit 724, a software authentication function activation unit 725, a software body function use unit 726, a software input data storage unit 727 and a software output data storage unit 728.

The message storage unit 721 is used to store messages written by the message writer 713.

When the IC card 720 is loaded into the kiosk terminal A or B, the kiosk terminal authentication unit 723 determines whether the pertinent kiosk terminal is an authorized terminal, and in accordance with the determination results, permits or inhibits the reading of data from or the writing data to the IC card 720 by the kiosk terminal. The three-path mutual authentication system (ISO/IEC9798-3) is employed for this authentication.

The software storage unit 723 holds the software A and the software B written by the kiosk terminals A and B. It should be noted that data in the software storage unit 723 can not be read by other terminals, including the IC card use terminal 710, i.e., the software storage unit 723 is tamper-proof.

The software authentication unit 724 specifies the software providers A and B based on digital signatures appended to the software A and the software B, and also confirms that the software A and the software B have not been altered. In this manner, the trustworthiness of the software A and the software B is determined.

The software authentication function activation unit 725 activates software authentication programs 751 and 761 (hereinafter also referred to as software authentication programs A and B), which are respectively included in the software A and the software B, so that the MPU of the IC card 720 executes these programs. Further, the software authentication function activation unit 725 enters the software B for the software authentication program A that has been activated, and receives a response therefrom. Similarly, the software authentication function activation unit 725 enters the software A for the software authentication program B that has been activated, and receives a response therefrom.

The software body function use unit 726 combines and employs the software bodies 752 and 762 (hereinafter also referred to as software bodies A and B) that are respectively included in the software A and the software B.

The software input data storage unit 727 holds data to be input to the software bodies 752 and 763, which are combined and used by the software body function use unit 726.

The software output data storage unit 728 holds data that are output by the software bodies 752 and 762, which are combined and used by the software body function use unit 726.

The kiosk terminal 730 includes an IC card insertion unit 731, an IC card authentication unit 732, a message reader 733, a software holding unit 734, a software electronic signature unit 735, a software writer 736 and a software trustworthiness termination unit 737. Hereinafter, symbol A may be employed instead of reference numerals 730 to 737. The kiosk terminal A corresponds to the information processing apparatus A in FIG. 1, and is a standalone, tamper-proof kiosk terminal. The kiosk terminal A is provided by: a computer that includes an input device, such as a keyboard, a mouse or a touch panel, an IC card reader/writer, a network interface for connecting to a data communication network, such as the Internet, and an external storage device, such as a permanent magnetic disk drive; and an OS and programs operated by the computer.

When the IC card 720 is loaded into the IC card reader/writer, the IC card insertion unit 731 detects this insertion and enables the IC card use terminal 710 to read data from and write data to the IC card 720.

The IC card authentication unit 732 determines whether the IC card 720, for which reading and writing by the IC card insertion unit 731 is ready, is authorized, and in accordance with the determination results, permits or inhibits the reading or writing of the IC card 720. The three-path mutual authentication system (ISO/IEC9798-3), for example, is employed for the authentication.

The message reader 733 reads a message from the message storage unit 721.

The software holding unit 734 holds the software A.

The software electronic signature unit 735 employs a public key encryption method to append a digital signature to the software A that is received from the software holding unit 734.

The software writer 736 writes, to the software storage unit 723, the software A to which the digital signature is appended by the software electronic signature unit 735.

The combination trustworthiness determination unit 737 examines the trustworthiness of software to be combined and used with the software A.

Since the arrangement of the kiosk terminal 740, i.e., the kiosk terminal B, is the same as the kiosk terminal 730, with the exception that the software A and the software B are reversed, no further explanation will be given. Also, in the following explanation, symbol B is employed instead of reference numerals 740 to 747.

The software 750, i.e., the software A, is formed of the software authentication program 751 and the software body 752. The software authentication program 751 is a computer program that is activated and executed by the software authentication function activation unit 725, and that employs, as input, part or all of the binary code that represents the software 760, i.e., the software B. In accordance with the output of the software authentication program 751, the trustworthiness of the software B is confirmed.

Similarly, the software 760, i.e., the software B, is formed of the software authentication program 761 and the software body 762. The software authentication program 761 is a computer program that is activated and executed by the software authentication function activation unit 725, and that employs, as input, part or all of the binary code that represents the software 750, i.e., the software A. In accordance with the output of the software authentication program 761, the trustworthiness of the software A is confirmed.

An explanation will now be given for the operation of the software use permission system 700 to permit the combined use of the software A and the software B.

Figure 8:
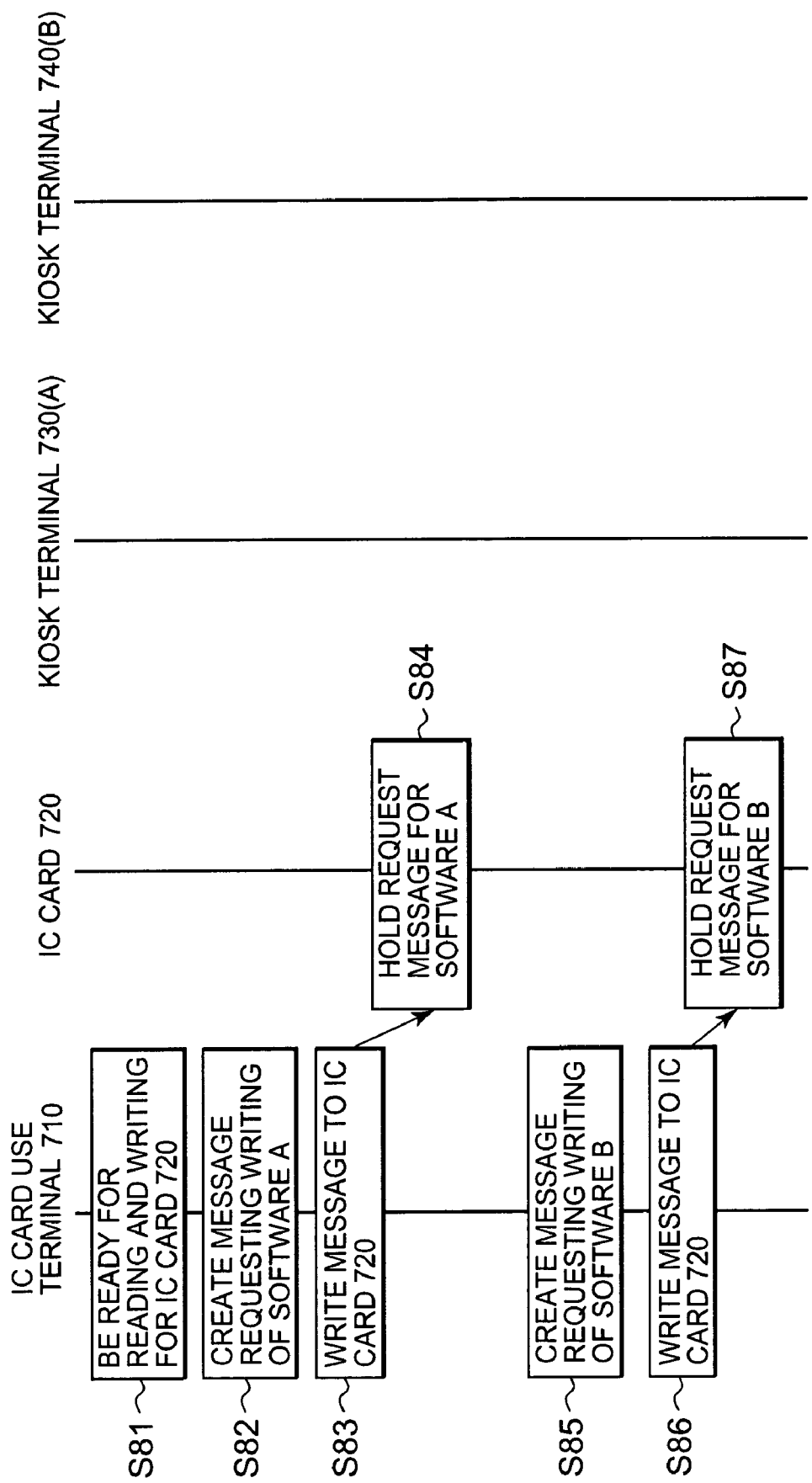
FIG. 8 is a functional block diagram showing a software use permission system according to a second embodiment of the present invention.

This operation will be described while referring to FIG. 8. When a user loads the IC card 720 into the IC card reader/writer of the IC card use terminal 710, the IC card insertion unit 711 detects the IC card 720 and enables the IC card use terminal 710 to read data from and write data to the IC card 720 (step S81).

In the IC card use terminal 710, the message creation unit 712 creates a message to the kiosk terminal 730 requesting the writing of the software A to the IC card 720 (step S82). The message writer 713 writes the thus created message to the message storage unit 721 (steps S83 and S84).

Furthermore, in the IC card use terminal 710, the message creation unit 712 creates a message to the kiosk terminal 740 requesting the writing of the software B to the IC card 720 (step S85). The message writer 713 writes the thus created message to the message storage unit 721 (steps S86 and S87).

Figure 9:
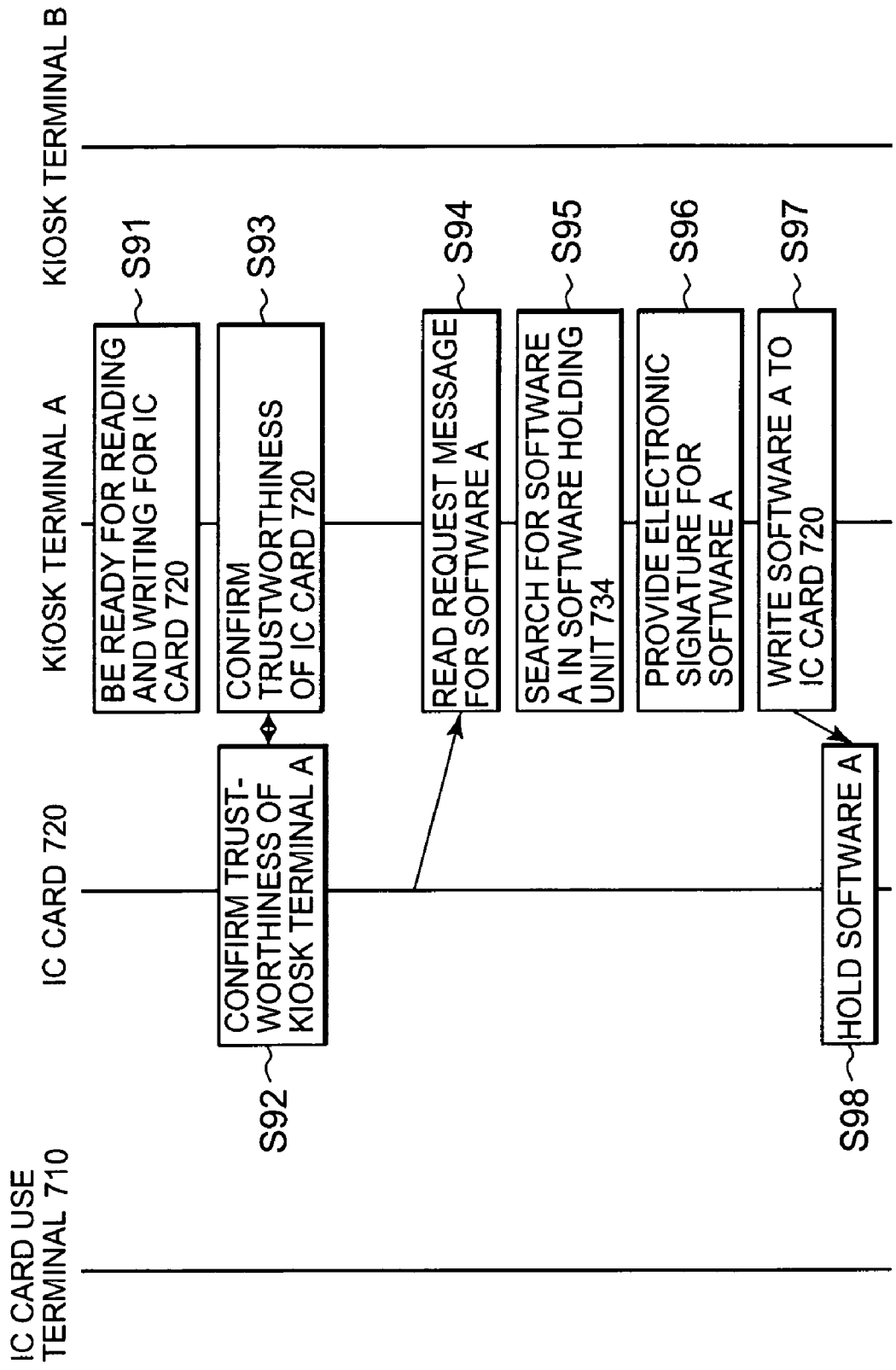
FIG. 9 is a flowchart for explaining the operation of the software use permission system in the second embodiment.

Thereafter, the user removes, from the IC card use terminal 710, the IC card 720 on which the messages have been written, and loads the IC card 720 into the IC card reader/writer of the kiosk terminal A. The processing performed by the kiosk terminal A wherein the IC card 720 is loaded will now be explained while referring to FIG. 9.

When the IC card 720 is loaded, the IC card insertion unit 731 detects the IC card 720, and enables the reading of data from and the writing of data to the IC card 720 by the kiosk terminal A (step S91). Then, the IC card 720 and the kiosk terminal A mutually examine the trustworthiness of the other (steps S92 and S93). When at least one of the devices cannot confirm the trustworthiness of the other, the processing is halted.

When the two devices confirm the trustworthiness of each other, the message reader 733 reads, from the message storage unit 721, the message stored at step S84 (step S94). The software holding unit 734 examines the stored software to find the software A that is designated by the message that is read (step S95), and transmits the software A to the software electronic signature unit 735.

The software A includes the software body 752 and the software authentication program 751 that permits the computer to perform the process for determining whether specific software to be combined and used with the software body 752 is appropriate from the viewpoint of the software provider A.

Upon receiving the software A, the software electronic signature unit 735 prepares a digital signature, using the public key encryption method, that it appends to the software A (step S96), and transmits the software A to the software writer 736. Then, the software writer 736 writes to the software storage unit 723 the software A to which the digital signature has been appended (steps S97 and S98).

Figure 10:
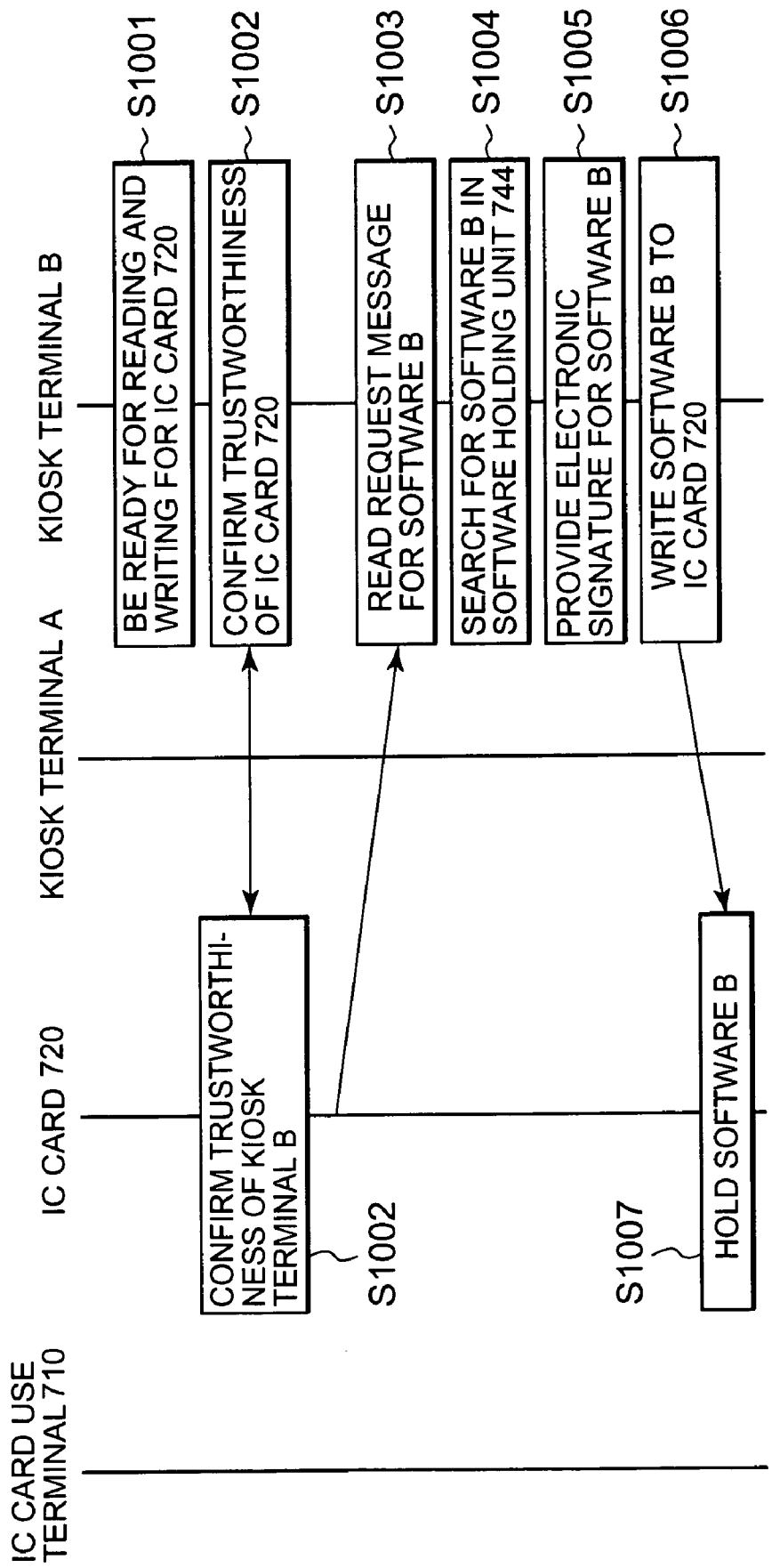
FIG. 10 is a flowchart for explaining the operation of the software use permission system in the second embodiment.
Figure 11:
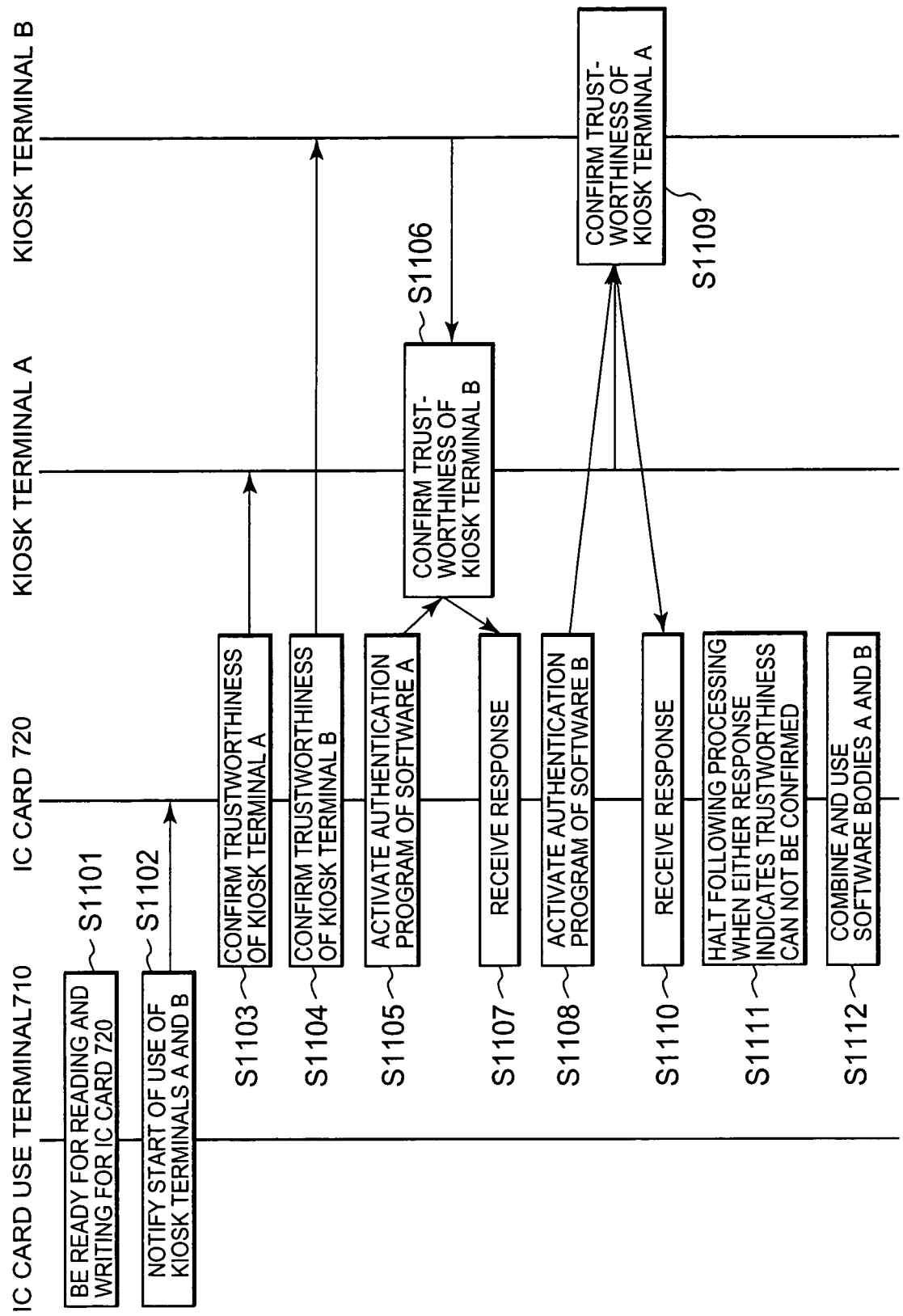
FIG. 11 is a flowchart for explaining the operation of the software use permission system in the second embodiment.
Figure 12:
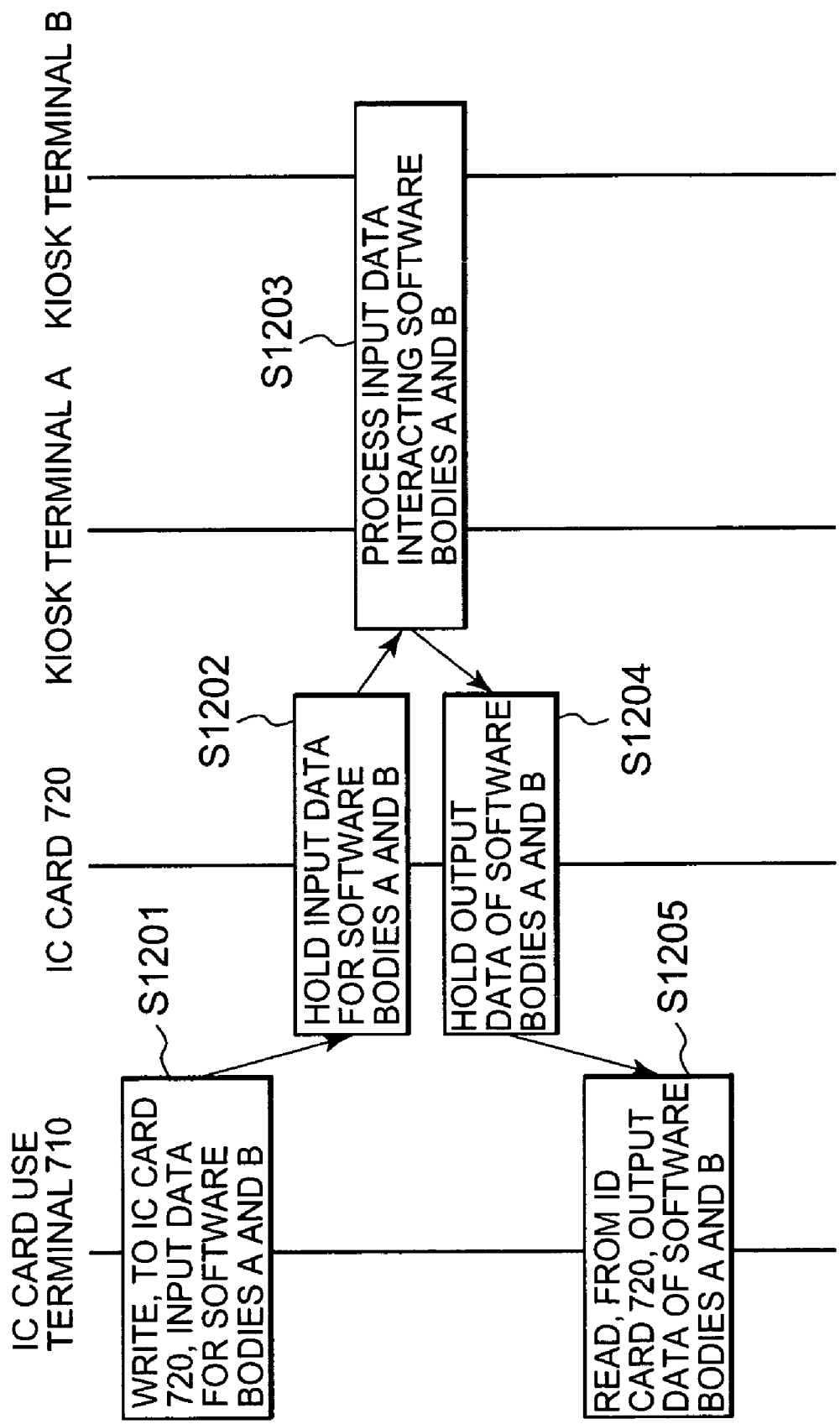
FIG. 12 is a flowchart for explaining the operation of the software use permission system in the second embodiment.

After the software A to which the digital signature is appended has been written to the IC card 720, the IC card 720 is removed from the kiosk terminal A, and is then loaded into the kiosk terminal B. The processing performed by the kiosk terminal B into which the IC card 720 is loaded is performed as is shown in FIG. 10, and since steps S1001 to S1008 are basically the same as steps S91 to S98, no further explanation for them will be given.

The IC card 720, whereon the software A and the software B, to which the digital signatures are appended, are stored, that is in the software storage unit 723 is again loaded into the IC card use terminal 710.

That is, when the user loads the IC card 720 into the IC card reader/writer of the IC card use terminal 710, the IC card insertion unit 711 detects the IC card 720, and enables the reading of data from and the writing of data to the IC card 720 by the IC card use terminal 710 (step S1101).

When the software A and the software B are to be combined and used in accordance with an instruction from the user or in accordance with an instruction from the OS or the program operated by the IC card use terminal 710, notification of this event is transmitted by the software use start unit 714 to the IC card 720 (step S1102).

Upon receiving the notification issued at step S1102, the software authentication unit 724 examines the trustworthiness of the kiosk terminals A and B, based on the digital signatures appended to the software A and the software B stored in the software storage unit 723 (steps S1103 and S1104). When the trustworthiness of at least one of the terminals cannot be confirmed, the following processing is halted.

When the trustworthiness of the two terminals can be confirmed, the IC card 720 performs the same processes as explained for the first embodiment at steps S63 to S68, and permits the software A and the software B to confirm the trustworthiness of each other (steps S1105 to S1110). At this time, data communication between the IC card 720 and the kiosk terminal A is performed via the IC card use terminal 710 and a data communication network (not shown). The data communication between the IC card 720 and the kiosk terminal B is performed in the same manner. When either the trustworthiness of the software B, from the viewpoint of the software A, or the trustworthiness of the software A, from the viewpoint of the software B, cannot be confirmed, the following processing is halted (step S1111). When the trustworthiness between the software A and the software B can be confirmed, the IC card 720 permits the combined use of the software A and the software B (step S1112).

When the combined use is permitted, the IC card 720 accepts data to be entered for the software A and the software B. When such data are received from the IC card use terminal 710 (step S1201), the software input data writer 715 stores the data in the software input data storage unit 727 (step S1202). The software A and the software B are employed by entering these data. Further, the kiosk terminals A and B perform a process, interacting with the software A and the software B via the data communication network (step S1203), and the process results are stored, as data output by the software A and the software B, in the software output data storage unit 728 (step S1204). The data in the software output data storage unit 728 are read, as needed, by the software output data reader 716, and are used for the other process performed by the IC card use terminal 710, or are displayed on the image display device of the IC card use terminal 710.

The effects of the software use permission system 700 will now be described.

The kiosk terminals A and B and the IC card 720 authenticate each other by using a system, such as the three-path mutual authentication system (ISO/IEC9798-3). Only when the authentication has been successful, the kiosk terminals A and B write the software A and the software B to the IC card 720. Therefore, the writing of the software A and the software B to a counterfeit IC card can be prevented.

As in the first embodiment, in addition to the authentication based on the digital signature, a database wherein authorized users are registered in advance may be examined to determine whether a user identified by a digital signature is an authorized user of the software A and the software B, and the software A and the software B may be transmitted only when the user is determined to be an authorized user.

Furthermore, before the software A is used, the software authentication program A is executed to determine whether the software B should be authenticated as being combined and used with the software A. Since this determination process is performed by the kiosk terminal A, skipping of the determination process by the IC card 720 or the IC card use terminal 710 can be prevented. The same thing can be applied for the software B.

In the above explanation for the second embodiment, as in the first embodiment, the software use permission system has been employed for the combined use of two types of software, i.e., the software A and the software B. However, it will be obvious to the one having ordinary skill in the art that this system can also be applied for the combined use of three or more types of software.

In the first and the second embodiments, the software authentication programs 371, 381, 751 and 761 communicate with the software distribution servers A and B, or the kiosk terminals A and B, which correspond to the information processing apparatuses A and B, and employ the determination results obtained by these apparatuses to determine the trustworthiness of the software A and the software B to be combined. That is, the determination process is performed by the information processing apparatuses A and B.

However, the present invention is not limited to this, and the determination process, for example, may be performed by the platform 2 based on digital signatures that are provided for the software to be combined. In the case of the first embodiment, the determination process performed by the combination trustworthiness determination unit 326 and 336 is performed by the software authentication function activation unit 317, and the combination trustworthiness determination units 326 and 336 are not required. Likewise, in the case of the second embodiment, the determination process performed by the combination trustworthiness determination unit 737 and 747 is performed by the software authentication function activation unit 725, and the combination trustworthiness determination units 737 and 747 are not required.

As is described above, according to the invention, the determination program is provided together with the software, and only when the determination program outputs the permission results, the combined use of two software applications is permitted. This permission process is performed by a computer, other than a platform that uses the software, that performs a process to provide the software. Furthermore, the authorization is examined based on the digital signature provided by using the public key encryption method. Therefore, false permission granted as a result of an illegal activity performed by the platform can be avoided.

The present invention has been explained by referring to the mode and the embodiments. However, the present invention is not limited to this mode and these embodiments, and can be modified or altered within the scope of the common knowledge of one having ordinary skill in the art.

What is claimed is:

1. A software use permission method for permitting or inhibiting combined use on a platform that comprises a computer of a plurality of types of software including a software body I and a software body II provided to the platform as digital electronic data, the method comprising the steps of:

preparing, before the providing of the software body I to the platform a determination computer program I operable to determine, as an authentication determination, whether to authenticate the software body II for the combined use with the software body I, the determination computer program I prepared and provided to the platform by a different computer;

providing, as software I, the determination computer program I combined with the software body I from a computer I to the platform;

executing the determination computer program I on the platform before the platform employs for the combined use the software body I with the software body II; and only when the determination computer program I determines that the software body II has been authenticated for the combined use with the software body I, performing a process by the platform to permit the combined use of the software body II with the software body I.

2. The software use permission method according to claim 1, wherein the software body II is provided as part of software II from a computer II together with a determination computer program II for determining, as a second authentication determination, an authenticity of the software body I; and wherein only when both the determination computer program I and the determination computer program II determine that the software I and the software II have been authenticated for the combined use, the computer II permits the combined use of the software body I and the software body II.

3. The software use permission method according to claim 2, wherein, in accordance with the program I, the platform transmits at least part of the software II to a predesignated computer A via a data communication network, the predesignated computer A being the different computer, wherein, based on part or all of the received software II, the computer A determines whether the combined use of the software II with the software I should be permitted, and transmits determination results I to the platform via the data communication network, wherein, in accordance with the determination computer program I, the platform performs a determination process based on the February 9 determination results I, wherein, in accordance with the determination computer program II, the platform transmits at least part of the software I to a predesignated computer B via the data communication network, wherein, based on part or all of the received software II, the computer B determines whether the combined use of the software II with the software I should be permitted, and transmits determination results II to the platform via the data communication network, and wherein, in accordance with the determination computer program II, the platform performs a determination process based on the received determination results II.

4. The software use permission method according to claim 3, wherein the computer A is the computer I or the computer B is the computer II.

5. The software use permission method according to claim 2, wherein the plurality of types of software includes three or more types of software, and wherein the method is employed to permit or inhibit use of at least one combination of two types of software from among the plurality of types of software.

6. The software use permission method according to claim 1, further comprising:

step 1 by the platform of generating a message I, for which a digital signature S is provided, that requests the providing of the software body I, and transmitting the message I to the computer I, generating a message II, for which the digital signature S is provided, that requests the providing of the software body II, and transmitting the message II to the computer II;

step 2 by the computer I of providing for the platform the software I with a digital signature I only when the authentication of the platform based on the digital signature S is successful;

step 3 by the computer II of providing for the platform the software II with a digital signature II only when the authentication of the platform based on the digital signature S is successful;

step 4 by the platform of authenticating the computer I and the computer II based on the digital signatures I and II provided for the software I and the software II;

step 5 by the platform of executing the determination computer programs I and II only when the authentication of both the computers I and II is successful; and step 6 by the platform of permitting the combined use of the software bodies I and II only when the determination computer programs I and II authenticate both the software I and the software II.

7. The software use permission method according to claim 1, wherein, in accordance with the authentication determination of the determination computer program I, the platform transmits information of the software II to a different computer via a data communication network, and the authentication determination is performed in accordance with determination results obtained by the different computer based on the information transmitted.

8. The software use determination method according to claim 7, wherein the different computer is the computer I.

9. The software use permission method according to claim 1, wherein the authentication by the determination computer program I is based on the digital signature attached in advance to the software II for permitting the combined use of the software body II with the software body I.

10. The software use permission method according to claim 1, wherein the computer I provides software that is encrypted by using an encryption key that conforms to a public encryption method and that is generated by the platform, and wherein, upon receiving the software, the platform decrypts the software using a decryption key that is generated and is to be paired with the encryption key.

11. The software use permission method according to claim 1, wherein the computer I provides the software I in accordance with a message generated by the platform; and wherein the message comprises address information indicating a location of the platform.

12. The software use permission method according to claim 11, wherein the address information is address information for the platform on a data communication network.

13. The software use permission method according to claim 11, wherein the address information indicates a geographical location of the platform.

14. The software use permission method according to claim 1, wherein the platform and the computer I are connected to a data communication network, and wherein the computer I provides the software I for the platform in accordance with a message that is generated by the platform and is transmitted to the computer I via the data communication network.

15. The software use permission method according to claim 1, wherein the platform and the computer I are connected to a data communication network, and wherein the computer I provides the software I for the platform via the data communication network.

16. The software use permission method according to claim 1, wherein the platform and the computer I each include a device for reading data from and writing data to a computer-readable removable recording medium, and whereby wherein the platform generates a message and writes the message to the recording medium, and the computer I provides the software I for the platform in accordance with the message read from the recording medium.

17. The software use permission method according to claim 1, wherein the platform and the computer I each include a device for reading data from and writing data to a computer-readable removable recording medium, and wherein, to provide the software I, the computer I writes the software I to the recording medium, and the platform reads the software I from the recording medium.

18. The software use permission method according to claim 17, wherein the recording medium is a RAM (Random Access Memory) comprised in an IC card.

19. The software use permission method according to claim 18, wherein the IC card comprises an MPU (Micro Processing Unit) and serves as the platform.

20. The software use permission method according to claim 1, wherein the software body I is comprised as part of the determination computer program I, and calling of the software body I is performed through the determination computer program I.

21. The software use permission method according to claim 1, wherein the software I is an operating system executed by the platform, and the software II is another computer program executed by the operating system.

22. The software use permission method according to claim 1, wherein the software I is an operating system executed by the platform, and the software II is data read by the operating system.

23. The software use permission method according to claim 1, wherein the platform comprises an operating system executed by the computer, and wherein the software I and the software II are computer programs executed by the operating system.

24. The software use permission method according to claim 1, wherein the platform comprises an operating system executed by the computer, and wherein the software I and the software II are data read by the operating system, or by a computer program executed by the operating system.

25. The software use permission method according to claim 1, wherein the platform comprises an operating system operated by the computer and a first computer program executed by the operating system, and wherein the software I and the software II are computer programs called by the first computer program.

26. A software use permission system for permitting or inhibiting on a platform that comprises a computer combined use of a plurality of types of software including a software body I and a software body II provided to the platform as digital electronic data, the system comprising:

the platform;

the software body I and the software body II, for which permitting or inhibiting of the combined use on the platform is determined;

a determination computer program I operable to determine, as an authentication determination, whether to authenticate the software body II for the combined use with the software body I, and is executed by the platform;

a computer I for providing, as software I, the software body I and the determination computer program I for the platform; and a computer II for providing software II for the platform, the software II including the software body II, wherein, only when the determination computer program I authenticates using the authentication determination the software body II the platform permits the combined use of the software body II with the software body I.

27. The software use permission system according to claim 26, wherein the software body II is provided as the software II through the computer II, together with a determination computer program II that is the second determination computer program, and wherein only when both the determination computer program I and the determination computer program II determine that the software I and the software II have been authenticated for the combined use, the computer II permits the combined use of the software body I and the software body II.

28. The software use permission system according to claim 27, further comprising:

computer A and computer B, for performing data communication with the platform through a data communication network, wherein, in accordance with the program I, the platform transmits at least part of the software II to the computer A via the data communication network, wherein, based on part or all of the received software II, the computer A determines whether the combined use of the software II with the software I should be permitted, and transmits determination results I to the platform via the data communication network, wherein, in accordance with the determination computer program I, the platform performs a determination process based on the received determination results I, wherein, in accordance with the determination computer program II, the platform transmits at least part of the software I to the computer B via the data communication network, wherein, based on part or all of the received software II, the computer B determines whether the combined use of the software II with the software I should be permitted, and transmits determination results II to the platform via the data communication network, and wherein, in accordance with the determination computer program II, the platform performs a determination process based on the received determination results II.

29. The software use permission system according to claim 28, wherein the computer A is the computer I or the computer B is the computer II.

30. The software use permission system according to claim 27, wherein the plurality of types of software includes three or more types of software, and wherein the system is employed to permit or inhibit use of at least one combination of two types of software from among the plurality of types of software.

31. The software use permission system according to claim 26, wherein the platform generates a message I, for which a digital signature S is provided, that requests the providing of the software body I, and a message II, for which a digital signature S is provided, that requests the providing of the software body II, wherein, only when the authentication of the platform based on the digital signature S is successful, the computer I provides, for the platform, the software I with a digital signature I, wherein, only when the authentication of the platform based on the digital signature S is successful, the computer II provides, for the platform, the software II with a digital signature II, wherein the platform authenticates the computer I and the computer II based on the digital signatures I and II provided for the software I and the software II, wherein the platform executes the determination computer programs I and II only when the authentication by both the computers I and II is successful, and wherein, only when the determination computer programs I and II authenticate both the software I and the software II, the platform permits the combined use of the software bodies I and II.

32. The software use permission system according to claim 26, further comprising a different computer for performing data communication with the platform through a data communication network, wherein, in accordance with the authentication determination of computer program I, the platform performs the data communication with a different computer via the data communication network, and performs the authentication determination in accordance with determination results obtained by the different computer.

33. The software use determination system according to claim 29, wherein the different computer is the computer I.

34. The software use permission system according to claim 26, wherein the determination computer program I permits, based on authentication results obtained based on a digital signature attached in advance to the software II, the platform to perform a process for permitting the combined use of the software II with the software body I.

35. The software use permission system according to claim 26, wherein the computer I provides software that is encrypted by using an encryption key that conforms to a public encryption method and that is generated by the platform, and wherein, upon receiving the software, the platform decrypts the software using a decryption key that is generated and is to be paired with the encryption key.

36. The software use permission system according to claim 26, wherein the computer I performs a process for providing the software I in accordance with a message generated by the platform, and wherein the message comprises address information indicating a location of the platform.

37. The software use permission system according to claim 36, wherein the address information is address information for the platform on a data communication network, and wherein, based on the address information, the software I is transmitted to the platform through the data communication network.

38. The software use permission system according to claim 36, wherein the address information indicates a geographical location of the platform.

39. The software use permission system according to claim 26, wherein the platform and the computer I are connected to a data communication network, and wherein the computer I provides the software I for the platform in accordance with a message that is generated by the platform and is transmitted to the computer I via the data communication network.

40. The software use permission system according to claim 26, wherein the platform and the computer I are connected to a data communication network, and wherein the computer I provides the software I for the platform via the data communication network.

41. The software use permission system according to claim 26, wherein the platform and the computer I have a device for reading data from and writing data to a computer-readable removable recording medium, and wherein the platform generates a message and writes the message to the recording medium, and the computer I provides the software I for the platform in accordance with the message read from the recording medium.

42. The software use permission system according to claim 26, wherein the platform and the computer I have a device for reading data from and writing data to a computer-readable removable recording medium, and wherein, to provide the software I, the computer I writes the software I to the recording medium, and the platform reads the software I from the recording medium.

43. The software use permission system according to claim 42, wherein the recording medium is a RAM (Random Access Memory) comprised in an IC card.

44. The software use permission system according to claim 43, wherein the IC card comprises an MPU (Micro Processing Unit) and serves as the platform.

45. The software use permission system according to claim 26, wherein the software body I is comprised as part of the determination computer program I, and calling of the software body I is performed through the determination computer program I.

46. The software use permission system according to claim 26, wherein the software I is an operating system executed by the platform or a computer program executed by the operating system, and the software II is another computer program executed by the operating system.

47. The software use permission system according to claim 26, wherein the software I is an operating system executed by the platform or a computer program executed by the operating system, and the software II is data read by the operating system.

48. The software use permission system according to claim 26, wherein the platform comprises an operating system executed by the computer, and wherein the software I and the software II are computer programs executed by the operating system.

49. The software use permission system according to claim 26, wherein the platform comprises an operating system executed by the computer, and wherein the software I and the software II are data read by the operating system, or by a computer program executed by the operating system.

50. The software use permission system according to claim 26, wherein the platform comprises an operating system operated by the computer and a first computer program executed by the operating system, and wherein the software I and the software II are computer programs called by the first computer program.

* * * * *